United States Patent
Wu et al.

(10) Patent No.: US 11,419,108 B2
(45) Date of Patent: Aug. 16, 2022

(54) METHOD AND DEVICE USED IN UE AND BASE STATION FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMIIED, Shanghai (CN)

(*) Notice: Subject to any disclaimer, the term of this patent is extended or adjusted under 35 U.S.C. 154(b) by 167 days.

(21) Appl. No.: 17/005,348

(22) Filed: Aug. 28, 2020

(65) Prior Publication Data
US 2020/0396729 A1 Dec. 17, 2020

Related U.S. Application Data

(63) Continuation of application No. PCT/CN2019/076880, filed on Mar. 4, 2019.

(30) Foreign Application Priority Data
Mar. 12, 2018 (CN) .......................... 201810200891.3

(51) Int. Cl.
*H04W 72/04* (2009.01)
*H04L 5/00* (2006.01)
(Continued)

(52) U.S. Cl.
CPC ........ *H04W 72/044* (2013.01); *H04B 7/0413* (2013.01); *H04B 7/0617* (2013.01);
(Continued)

(58) Field of Classification Search
CPC ................ H04B 7/0617; H04B 7/0452; H04B 7/0413–0486; H04B 7/0613–0697;
(Continued)

(56) References Cited

U.S. PATENT DOCUMENTS

2016/0227559 A1 8/2016 Schober et al.
2019/0222288 A1* 7/2019 Zhou .................... H04B 7/0408
(Continued)

FOREIGN PATENT DOCUMENTS

CN 110248412 A * 9/2019 ........... H04L 5/0048

OTHER PUBLICATIONS

Clarivate Analytics, "English Translation of CN 110248112" 2022 (Year: 2022).*
(Continued)

*Primary Examiner* — Maharishi V Khirodhar
*Assistant Examiner* — Kenneth P Hunt

(57) ABSTRACT

The present disclosure provides method and device in a User Equipment (UE) and a base station used for wireless communication. The UE receives a first signaling and a second signaling; and transmits first reporting information in a target time-frequency resource. The first signaling and the second signaling are respectively used to determine a first antenna port group and a second antenna port group; a first antenna port group and a second antenna port group are respectively applicable to a first time-frequency resource and a second time-frequency resource; at least one of the following is used to determine the target time-frequency resource from the first time-frequency resource and the second time-frequency resource: the first antenna port group, the second antenna port group. When uplink data and control information for different TRPs conflict in time domain, the above method guarantees the reception quality of the two and avoids an extra delay.

20 Claims, 23 Drawing Sheets

(51) Int. Cl.
*H04B 7/06* (2006.01)
*H04B 7/0413* (2017.01)

(52) U.S. Cl.
CPC .......... *H04L 5/0005* (2013.01); *H04L 5/0007* (2013.01); *H04L 5/0044* (2013.01)

(58) Field of Classification Search
CPC ..... H04B 7/024; H04L 5/0005; H04L 5/0007; H04L 5/0044; H04L 5/0023; H04L 5/0025; H04L 5/00005; H04L 5/001; H04W 72/044; H04W 16/28; H04W 72/046

See application file for complete search history.

(56) References Cited

U.S. PATENT DOCUMENTS

2019/0268917 A1* 8/2019 Zhang .................. H04L 5/0092
2021/0175958 A1* 6/2021 Pretl .................... H04B 7/0874

OTHER PUBLICATIONS

«3GPP TSG RAN WG1 Meeting #88 R1-1703144» Sony Discussion on Remaining Details of Resource Selection for P-UEs Feb. 17, 2017.

1st Office Action in application No. 201810200891.3 dated Mar. 12, 2020.

1st Search Report in application No. 201810200891.3 dated Mar. 4, 2020.

Supplementary Search Report in application No. 201810200891.3 dated Apr. 16, 2020.

Notice of allowance in application No. 201810200891.3 dated Apr. 30, 2020.

ISR in application No. PCT/CN2017/2019/076880 dated Apr. 15, 2019.

* cited by examiner

METHOD AND DEVICE USED IN UE AND BASE STATION FOR WIRELESS COMMUNICATION

CROSS REFERENCE TO RELATED APPLICATIONS

This application is a continuation of International Application No. PCT/CN2019/076880, filed Mar. 4, 2019, claims the priority benefit of Chinese Patent Application No. 201810200891.3, filed on Mar. 12, 2018, the full disclosure of which is incorporated herein by reference.

BACKGROUND

Technical Field

The present disclosure relates to methods and devices in wireless communication systems, and in particular to a method and a device in a wireless communication system that supports multi-antenna transmission.

Related Art

Massive Multi-Input Multi-Output (MIMO) becomes a hot topic when studying next generation mobile communications. For the massive MIMO, multiple antennas based on beamforming form a narrow beam which points to a particular direction to improve the quality of communication. Since a beam formed by beamforming of multiple antennas is usually narrow, beams from a base station and a User Equipment (UE) need to be aligned for effective communications. When beams of a base station and a UE are out of synchronization due to a blocking or a UE movement, that is, they are not aligned, the communication quality between the two will be greatly declined or even the two are unable to communicate.

Multiple Transmitter Receiver Points (TRP) can serve a UE simultaneously so as to improve robustness of communication and transmission rate of a single UE. A UE uses different beams to align beams from different TRPs to form multiple beam pairs. The plurality of beam pairs may transmit same data to improve communication reliability of the UE, or may transmit varied data to enhance the throughput of the UE.

SUMMARY

The inventors have found through researches that in the case of multiple TRPs serving a UE at the same time, uplink transmission for multiple TRPs needs to be transmitted with a correct beamforming vector to ensure that it can be received correctly by a corresponding TRP. When uplink data and uplink control information for different TRPs conflict in time domain, whether the uplink control information for another TRP can be carried on a physical layer data channel for one TRP needs to be determined according to transmitting beams of two TRPs; otherwise, a reception of the uplink control information will fail, or an extra delay is incurred due to the uplink control information needs to be transmitted from one TRP to another TRP.

In view of the above problem, the present disclosure provides a solution. It should be noted that although the initial motivation of the present disclosure is for multi-TRP transmission, the present disclosure is also applicable to single-TRP transmission. It should be noted that the embodiments of a User Equipment in the present disclosure and the characteristics in the embodiments may be applied to a base station if no conflict is incurred, and vice versa. The embodiments of the present disclosure and the characteristics of the embodiments may be mutually combined if no conflict is incurred.

The present disclosure provides a method in a User Equipment (UE) for wireless communication, comprising:
  receiving a first signaling and a second signaling; and
  transmitting first reporting information in a target time-frequency resource, the target time-frequency resource being one of a first time-frequency resource and a second time-frequency resource;
  wherein the first signaling and the second signaling are respectively used to determine a first antenna port group and a second antenna port group; the first antenna port group and the second antenna port group are respectively applicable to the first time-frequency resource and the second time-frequency resource; an antenna port group comprises a positive integer number of antenna port(s); at least one of the following is used to determine the target time-frequency resource from the first time-frequency resource and the second time-frequency resource:
  the first antenna port group;
  the second antenna port group;
  the first time-frequency resource;
  the second time-frequency resource; and
  first information, wherein the first information explicitly indicates the target time-frequency resource from the first time-frequency resource and the second time-frequency resource.

In one embodiment, a problem needed to be solved in the present disclosure is: when uplink data for one target receiver and uplink control information for another target receiver are transmitted on a same physical layer data channel, the reception quality of uplink control information decreases due to that a uplink beam for one target receiver is used to transmit uplink control information for another target receiver; or an extra delay is incurred due to that uplink control information needs to be transmitted from one target receiver to another. The above method implicitly or explicitly indicates whether uplink data and uplink control information can be transmitted on a same physical layer channel, so as to solve the problem.

In one embodiment, the feature of the present disclosure is that the first radio resource is allocated to uplink data, the second radio resource is allocated to the first reporting information, and the first reporting information comprises uplink control information; when the first radio resource conflicts with the second radio resource in time domain, whether the first reporting information and uplink data can be transmitted on a same physical layer channel depends on transmission antenna port groups of the both. The method is advantageous in avoiding transmitting control information for another TRP by using a beam for one TRP, and ensuring a correct reception of uplink control information by its target receiver.

In one embodiment, the above method is advantageous in that a correct beam is always used to transmit the first reporting information, ensuring the transmission reliability of the first reporting information, and avoiding an extra delay.

In one embodiment, the above method is advantageous in that the target time-frequency resource is implicitly indicated by the first antenna port group and the second antenna port group, or the first time-frequency resource and the second time-frequency resource, which saves the overhead of a downlink control signaling.

According to one aspect of the present disclosure, comprising:

receiving a first radio signal;

wherein the first reporting information is used to indicate whether the first radio signal is correctly received.

According to one aspect of the present disclosure, comprising:

receiving a first reference signal;

wherein a measurement on the first reference signal is used to determine the first reporting information.

According to one aspect of the present disclosure, comprising:

transmitting a second radio signal in the first time-frequency resource;

wherein the first signaling comprises scheduling information of the second radio signal.

According to one aspect of the present disclosure, comprising:

receiving first downlink information;

wherein the first downlink information indicates N1 port group sets, the N1 being a positive integer greater than 1, and a port group set comprises a positive integer number of antenna port group(s); if the first antenna port group and the second antenna port group belong to a same port group set among the N1 port group sets, the target time-frequency resource is the first time-frequency resource, otherwise the target time-frequency resource is the second time-frequency resource.

According to one aspect of the present disclosure, comprising:

receiving second downlink information;

wherein the second downlink information indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource.

According to one aspect of the present disclosure, comprising:

receiving the first information;

wherein the first information explicitly indicates the target time-frequency resource from the first time-frequency resource and the second time-frequency resource.

According to one aspect of the present disclosure, wherein the target time-frequency resource is independent of a signaling format of the first signaling and a signaling format of the second signaling.

The present disclosure provides a method in a base station for wireless communication, comprising:

transmitting a first signaling and a second signaling; and receiving first reporting information in a target time-frequency resource, the target time-frequency resource being one of a first time-frequency resource and a second time-frequency resource;

wherein the first signaling and the second signaling are respectively used to determine a first antenna port group and a second antenna port group; the first antenna port group and the second antenna port group are respectively applicable to the first time-frequency resource and the second time-frequency resource; an antenna port group comprises a positive integer number of antenna port(s); at least one of the following is used to determine the target time-frequency resource from the first time-frequency resource and the second time-frequency resource:

the first antenna port group;

the second antenna port group;

the first time-frequency resource;

the second time-frequency resource; and first information, wherein the first information explicitly indicates the target time-frequency resource from the first time-frequency resource and the second time-frequency resource.

According to one aspect of the present disclosure, comprising:

transmitting a first radio signal;

wherein the first reporting information is used to indicate whether the first radio signal is correctly received.

According to one aspect of the present disclosure, comprising:

transmitting a first reference signal;

wherein a measurement on the first reference signal is used to determine the first reporting information.

According to one aspect of the present disclosure, comprising:

receiving a second radio signal in the first time-frequency resource;

wherein the first signaling comprises scheduling information of the second radio signal.

According to one aspect of the present disclosure, comprising:

transmitting first downlink information;

wherein the first downlink information indicates N1 port group sets, the N1 being a positive integer greater than 1, and a port group set comprises a positive integer number of antenna port group(s); if the first antenna port group and the second antenna port group belong to a same port group set among the N1 port group sets, the target time-frequency resource is the first time-frequency resource, otherwise the target time-frequency resource is the second time-frequency resource.

According to one aspect of the present disclosure, comprising:

transmitting second downlink information;

wherein the second downlink information indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource.

According to one aspect of the present disclosure, comprising:

transmitting the first information;

wherein the first information explicitly indicates the target time-frequency resource from the first time-frequency resource and the second time-frequency resource.

According to one aspect of the present disclosure, wherein the target time-frequency resource is independent of a signaling format of the first signaling and a signaling format of the second signaling.

The present disclosure provides a UE for wireless communication, comprising:

a first receiver, receiving a first signaling and a second signaling; and a first transmitter, transmitting first reporting information in a target time-frequency resource, the target time-frequency resource being one of a first time-frequency resource and a second time-frequency resource;

wherein the first signaling and the second signaling are respectively used to determine a first antenna port group and a second antenna port group; the first antenna port group and the second antenna port group are respectively applicable to the first time-frequency resource and the second time-frequency resource; an antenna port group comprises a positive integer number of antenna port(s); at least one of the following is used to determine the target time-frequency resource from the first time-frequency resource and the second time-frequency resource:

the first antenna port group;
the second antenna port group;
the first time-frequency resource;
the second time-frequency resource; and
first information, wherein the first information explicitly indicates the target time-frequency resource from the first time-frequency resource and the second time-frequency resource.

In one embodiment, the above UE for wireless communication is characterized in that the first receiver further receives a first radio signal; wherein the first reporting information is used to indicate whether the first radio signal is correctly received.

In one embodiment, the above UE for wireless communication is characterized in that the first receiver further receives a first reference signal; wherein a measurement on the first reference signal is used to determine the first reporting information.

In one embodiment, the above UE for wireless communication is characterized in that the first transmitter further transmits a second radio signal in the first time-frequency resource; wherein the first signaling comprises scheduling information of the second radio signal.

In one embodiment, the above UE for wireless communication is characterized in that the first receiver further receives first downlink information; wherein the first downlink information indicates N1 port group sets, the N1 being a positive integer greater than 1, and a port group set comprises a positive integer number of antenna port group(s); if the first antenna port group and the second antenna port group belong to a same port group set among the N1 port group sets, the target time-frequency resource is the first time-frequency resource, otherwise the target time-frequency resource is the second time-frequency resource.

In one embodiment, the above UE for wireless communication is characterized in that the first receiver further receives second downlink information; wherein the second downlink information indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource.

In one embodiment, the above UE for wireless communication is characterized in that the first receiver further receives the first information; wherein the first information explicitly indicates the target time-frequency resource from the first time-frequency resource and the second time-frequency resource.

In one embodiment, the above UE for wireless communication is characterized in that the target time-frequency resource is independent of a signaling format of the first signaling and a signaling format of the second signaling.

The present disclosure provides a base station for wireless communication, comprising:

a second transmitter, transmitting a first signaling and a second signaling;
and
a second receiver, receiving first reporting information in a target time-frequency resource, the target time-frequency resource being one of a first time-frequency resource and a second time-frequency resource;

wherein the first signaling and the second signaling are respectively used to determine a first antenna port group and a second antenna port group; the first antenna port group and the second antenna port group are respectively applicable to the first time-frequency resource and the second time-frequency resource; an antenna port group comprises a positive integer number of antenna port(s); at least one of the following is used to determine the target time-frequency resource from the first time-frequency resource and the second time-frequency resource:

the first antenna port group;
the second antenna port group;
the first time-frequency resource;
the second time-frequency resource; and
first information, wherein the first information explicitly indicates the target time-frequency resource from the first time-frequency resource and the second time-frequency resource.

In one embodiment, the above base station for wireless communication is characterized in that the second transmitter further transmits a first radio signal; wherein the first reporting information is used to indicate whether the first radio signal is correctly received.

In one embodiment, the above base station for wireless communication is characterized in that the second transmitter further transmits a first reference signal; wherein a measurement on the first reference signal is used to determine the first reporting information.

In one embodiment, the above base station for wireless communication is characterized in that the second receiver further receives a second radio signal in the first time-frequency resource; wherein the first signaling comprises scheduling information of the second radio signal.

In one embodiment, the above base station for wireless communication is characterized in that the second transmitter further transmits first downlink information; wherein the first downlink information indicates N1 port group sets, the N1 being a positive integer greater than 1, and a port group set comprises a positive integer number of antenna port group(s); if the first antenna port group and the second antenna port group belong to a same port group set among the N1 port group sets, the target time-frequency resource is the first time-frequency resource, otherwise the target time-frequency resource is the second time-frequency resource.

In one embodiment, the above base station for wireless communication is characterized in that the second transmitter further transmits second downlink information; wherein the second downlink information indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource.

In one embodiment, the above base station for wireless communication is characterized in that the second transmitter further transmits the first information; wherein the first information explicitly indicates the target time-frequency resource from the first time-frequency resource and the second time-frequency resource.

In one embodiment, the above base station for wireless communication is characterized in that the target time-frequency resource is independent of a signaling format of the first signaling and a signaling format of the second signaling.

In one embodiment, the present disclosure has the following advantages over conventional schemes:

when uplink data and uplink control information conflict in time domain, according to their respective beam directions to determine whether to carry uplink control information on a physical layer channel carrying uplink data, which avoids the decline in reception quality of control information incurred by transmitting uplink control information for another TRP with a beam for one TRP, and avoids an extra reception delay incurred by the fact that uplink control information needs to be transmitted from one TRP to another TRP.

A transmission antenna port group or time-frequency resources corresponding to uplink data and uplink control information are used to implicitly indicate whether the two can be transmitted on a same physical-layer channel, saving the overhead of a downlink control signaling.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
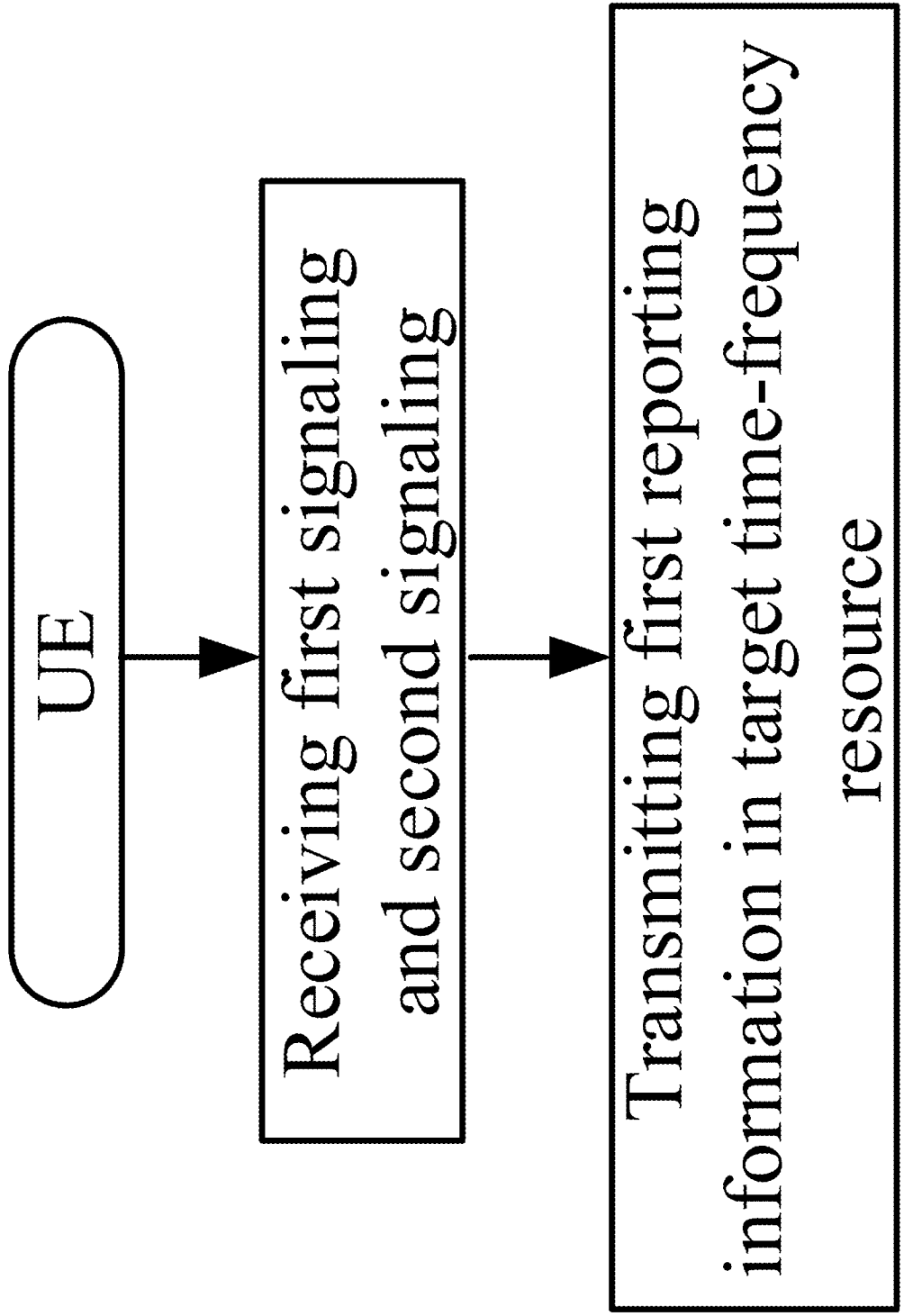
FIG. 1 illustrates a flowchart of a first signaling, a second signaling and first reporting information according to one embodiment of the present disclosure.

Embodiment 1 illustrates a flow chart of a first signaling, a second signaling and first reporting information, as shown in FIG. 1.

In Embodiment 1, the UE in the present disclosure receives a first signaling and a second signaling; then transmitting first reporting information in a target time-frequency resource, and the target time-frequency resource is one of a first time-frequency resource and a second time-frequency resource; wherein the first signaling and the second signaling are respectively used to determine a first antenna port group and a second antenna port group; the first antenna port group and the second antenna port group are respectively applicable to the first time-frequency resource and the second time-frequency resource; and an antenna port group comprises a positive integer number of antenna port(s). At least one of the following is used to determine the target time-frequency resource from the first time-frequency resource and the second time-frequency resource: the first antenna port group, the second antenna port group, the first time-frequency resource, the second time-frequency resource and first information; wherein the first information explicitly indicates the target time-frequency resource from the first time-frequency resource and the second time-frequency resource.

In one embodiment, if the target time-frequency resource is the first time-frequency resource, at least one transmission antenna port of the first reporting information and one antenna port of the first antenna port group are Quasi Co-Located.

In one embodiment, if the target time-frequency resource is the first time-frequency resource, any transmission antenna port of the first reporting information and one antenna port of the first antenna port group are QCL.

In one embodiment, if the target time-frequency resource is the first time-frequency resource, the first reporting information is transmitted by all or part of antenna ports of the first antenna port group.

In one embodiment, if the target time-frequency resource is the second time-frequency resource, at least one transmission antenna port of the first reporting information and one antenna port of the second antenna port group are QCL.

In one embodiment, if the target time-frequency resource is the second time-frequency resource, any transmission antenna port of the first reporting information and one antenna port of the second antenna port group are QCL.

In one embodiment, if the target time-frequency resource is the second time-frequency resource, the first reporting information is transmitted by all or part of antenna ports of the second antenna port group.

In one embodiment, the first information is carried by the first signaling.

In one embodiment, the first information is carried by the second signaling.

In one embodiment, the first time-frequency resource and the second time-frequency resource occupy same time resources in time domain.

In one embodiment, the first time-frequency resource partially overlaps with time resources occupied by the second time-frequency resource.

In one embodiment, the first signaling is a physical layer signaling.

In one embodiment, the first signaling is a dynamic signaling.

In one embodiment, the first signaling is a dynamic signaling used for UpLink Grant.

In one embodiment, the first signaling comprises Downlink Control Information (DCI).

In one embodiment, the first signaling comprises UpLink Grant DCI.

In one embodiment, the first signaling group is UE-specific.

In one embodiment, a signaling identifier of the first signaling is a Cell-Radio Network Temporary Identifier (C-RNTI).

In one embodiment, the first signaling is DCI identified by a C-RNTI.

In one embodiment, the second signaling is a physical layer signaling.

In one embodiment, the second signaling is a dynamic signaling.

In one embodiment, the second signaling is a dynamic signaling used for Downlink Grant.

In one embodiment, the second signaling comprises DCI.

In one embodiment, the second signaling comprises DownLink Grant DCI.

In one embodiment, the second signaling is UE-specific.

In one embodiment, a signaling identifier for the second signaling is a C-RNTI.

In one embodiment, the second signaling is DCI identified by a C-RNTI.

In one embodiment, the second signaling is a higher-layer signaling.

In one embodiment, the second signaling is an RRC (Radio Resource Control) signaling.

In one embodiment, the second signaling is a MAC CE (Medium Access Control layer Control Element) signaling.

In one embodiment, time resources occupied by the first signaling are earlier than time resources occupied by the second signaling.

In one embodiment, time resources occupied by the first signaling are later than time resources occupied by the second signaling.

In one embodiment, the first signaling and the second signaling occupy same time resources.

In one embodiment, time resources occupied by the first signaling partially overlap with time resources occupied by the second signaling.

In one embodiment, time resources occupied by the first signaling and time resources occupied by the second signaling are mutually orthogonal (not overlapping).

In one embodiment, the first reporting information comprises Uplink control information (UCI).

In one embodiment, the first reporting information comprises Hybrid Automatic Repeat reQuest-Acknowledgement (HARQ-ACK).

In one embodiment, the first reporting information comprises a Scheduling Request (SR).

In one embodiment, the first reporting information comprises a Channel-state information reference signals Resource Indicator (CRI).

In one embodiment, the first reporting information comprises Channel-State Information (CSI).

In one subembodiment of the above embodiment, the CSI comprises one or more of a Rank Indicator (RI), CRI, a Precoding Matrix Indicator (PMI), Reference Signal Received Power (RSRP), Reference Signal Received Quality (RSRQ), and a Channel Quality Indicator (CQI).

In one embodiment, the first reporting information is one of reporting information with periodic occurrence.

In one embodiment, the first reporting information is one of reporting information with semi-persistent occurrence.

In one embodiment, the first reporting information is aperiodic reporting information.

In one embodiment, the target time-frequency resource is the first time-frequency resource.

In one embodiment, the target time-frequency resource is the second time-frequency resource.

In one embodiment, the first signaling indicates the first antenna port group.

In one embodiment, the first signaling indicates the first time-frequency resource.

In one embodiment, the first signaling explicitly indicates the first antenna port group.

In one embodiment, the first signaling explicitly indicates the first time-frequency resource.

In one embodiment, the first signaling implicitly indicates the first antenna port group.

In one embodiment, the first signaling implicitly indicates the first time-frequency resource.

In one embodiment, the second signaling indicates the second antenna port group.

In one embodiment, the second signaling indicates the second time-frequency resource.

In one embodiment, the second signaling explicitly indicates the second antenna port group.

In one embodiment, the second signaling explicitly indicates the second time-frequency resource.

In one embodiment, the second signaling implicitly indicates the second antenna port group.

In one embodiment, the second signaling implicitly indicates the second time-frequency resource.

In one embodiment, if the target time-frequency resource is the first time-frequency resource, the first signaling indicates scheduling information of a radio signal carrying the first reporting information.

In one subembodiment of the above embodiment, the scheduling information of a first radio signal carrying the first reporting information includes at least one of time domain resources occupied, frequency-domain resources occupied, a Modulation and Coding Scheme (MCS), configuration information of DeModulation Reference Signals (DMRS), a Hybrid Automatic Repeat reQuest (HARD) process number, a Redundancy Version (RV), a New Data Indicator (NDI), corresponding Spatial Tx parameters, or corresponding Spatial Rx parameters.

In one embodiment, if the target time-frequency resource is the second time-frequency resource, the second signaling indicates scheduling information of a radio signal carrying the first reporting information.

In one subembodiment of the above embodiment, the scheduling information of a radio signal carrying the first reporting information includes at least one of time-domain resources occupied, frequency-domain resources occupied, code-domain resources occupied, a cyclic shift, a Orthogonal Cover Code (OCC), configuration information of DMRS, corresponding Spatial Tx parameters, corresponding Spatial Rx parameters, a PUCCH format, or a UCI content.

In one embodiment, configuration information of DMRS includes one or more of time domain resources occupied, frequency domain resources occupied, code domain resources occupied, RS sequence, mapping mode, DMRS type, cyclic shift, and Orthogonal Cover Code (OCC).

In one embodiment, the first antenna port group and the second antenna port group are used to determine the target time-frequency resource from the first time-frequency resource and the second time-frequency resource.

In one embodiment, the first time-frequency resource and the second time-frequency resource are used to determine the target time-frequency resource from the first time-frequency resource and the second time-frequency resource.

In one embodiment, at least one of a transmission antenna port group of the first signaling or a transmission antenna port group of the second signaling is used to determine the target time-frequency resource from the first time-frequency resource and the second time-frequency resource.

In one embodiment, at least one transmission antenna port of the second signaling and at least one antenna port of a third reference antenna port group are QCL; if the third reference antenna port group and a second reference antenna port group belong to a same port group set among N3 port group sets, the target time-frequency resource is the first time-frequency resource; otherwise the target time-frequency resource is the second time-frequency resource. Spatial Rx parameters of a radio signal transmitted on the second reference antenna port group are used to determine spatial Tx parameters corresponding to the first antenna port group. A port group set comprises a positive integer number of antenna port group(s). The N3 is a positive integer greater than 1.

In one subembodiment of the above embodiment, the N3 is equal to 2.

In one subembodiment of the above embodiment, the N3 is greater than 2.

In one subembodiment of the above embodiment, the N3 port group sets are configured by a higher-layer signaling.

In one subembodiment of the above embodiment, the N3 port group sets are configured by an RRC signaling.

In one subembodiment of the above embodiment, the N3 port group sets are configured by a MAC CE signaling.

In one embodiment, if at least one transmission antenna port of the second signaling and at least one antenna port of the second reference antenna port group are QCL, the target time-frequency resource is the first time-frequency resource; if any transmission antenna port of the second signaling and any antenna port of the second reference antenna port group are not QCL, the target time-frequency resource is the second time-frequency resource.

In one embodiment, at least one transmission antenna port of the first signaling and at least one antenna port of a fifth reference antenna port group are QCL; if the fifth reference antenna port group and a sixth reference antenna port group belong to a same port group set among the N3 port group sets, the target time-frequency resource is the first time-frequency resource; otherwise the target time-frequency resource is the second time-frequency resource. Spatial Rx parameters of a radio signal transmitted on the sixth reference antenna port group are used to determine Spatial Tx parameters corresponding to the second antenna port group.

In one embodiment, if at least one transmission antenna port of the first signaling and at least one antenna port of the sixth reference antenna port group are QCL, the target time-frequency resource is the first time-frequency resource; if any transmission antenna port of the second signaling and any antenna port of the sixth reference antenna port group are not QCL, the target time-frequency resource is the second time-frequency resource.

In one embodiment, time-frequency resources occupied by the first signaling and the second signaling are used to determine the target time-frequency resource from the first time-frequency resource and the second time-frequency resource.

Embodiment 2

Figure 2:
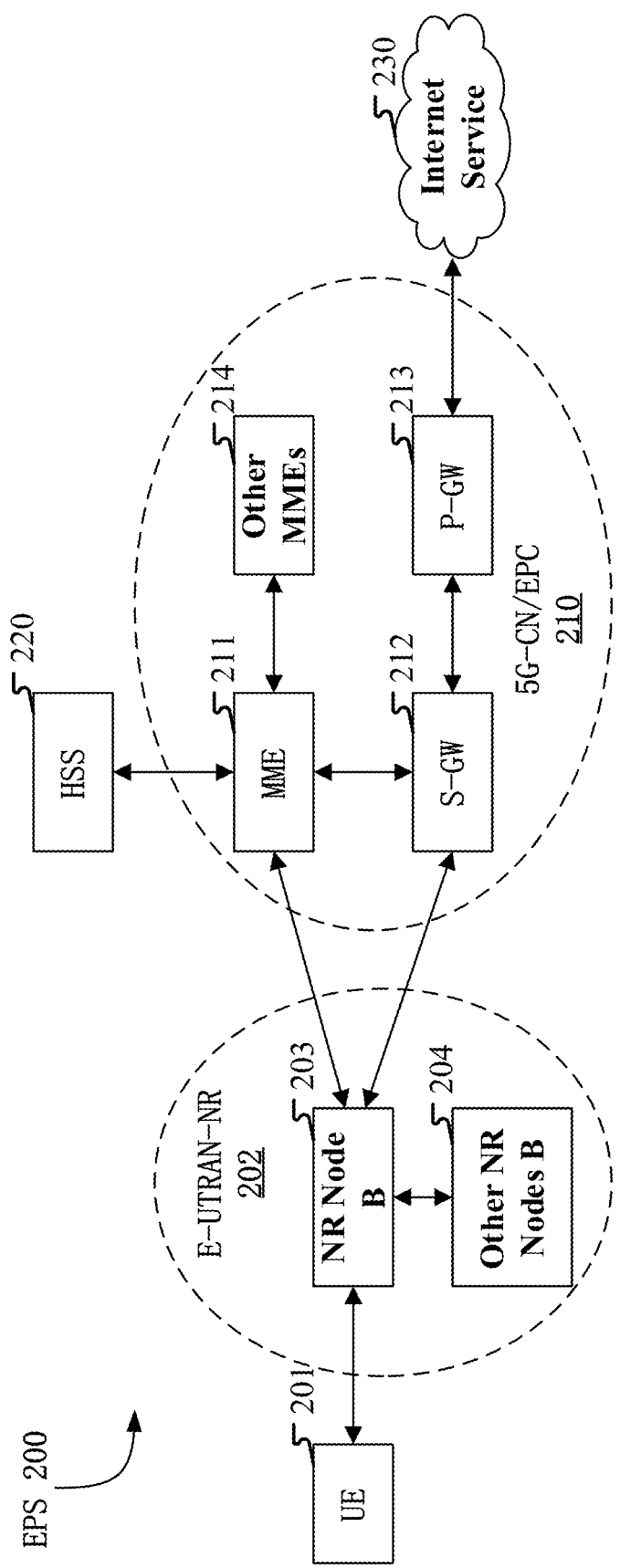
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises an MME 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSSs).

In one embodiment, the gNB 203 corresponds to the base station in the present disclosure.

In one embodiment, the UE 201 corresponds to the UE in the present disclosure.

In one embodiment, the UE 201 supports multi-antenna transmission.

In one embodiment, the gNB 203 supports multi-antenna transmission.

Embodiment 3

Figure 3:
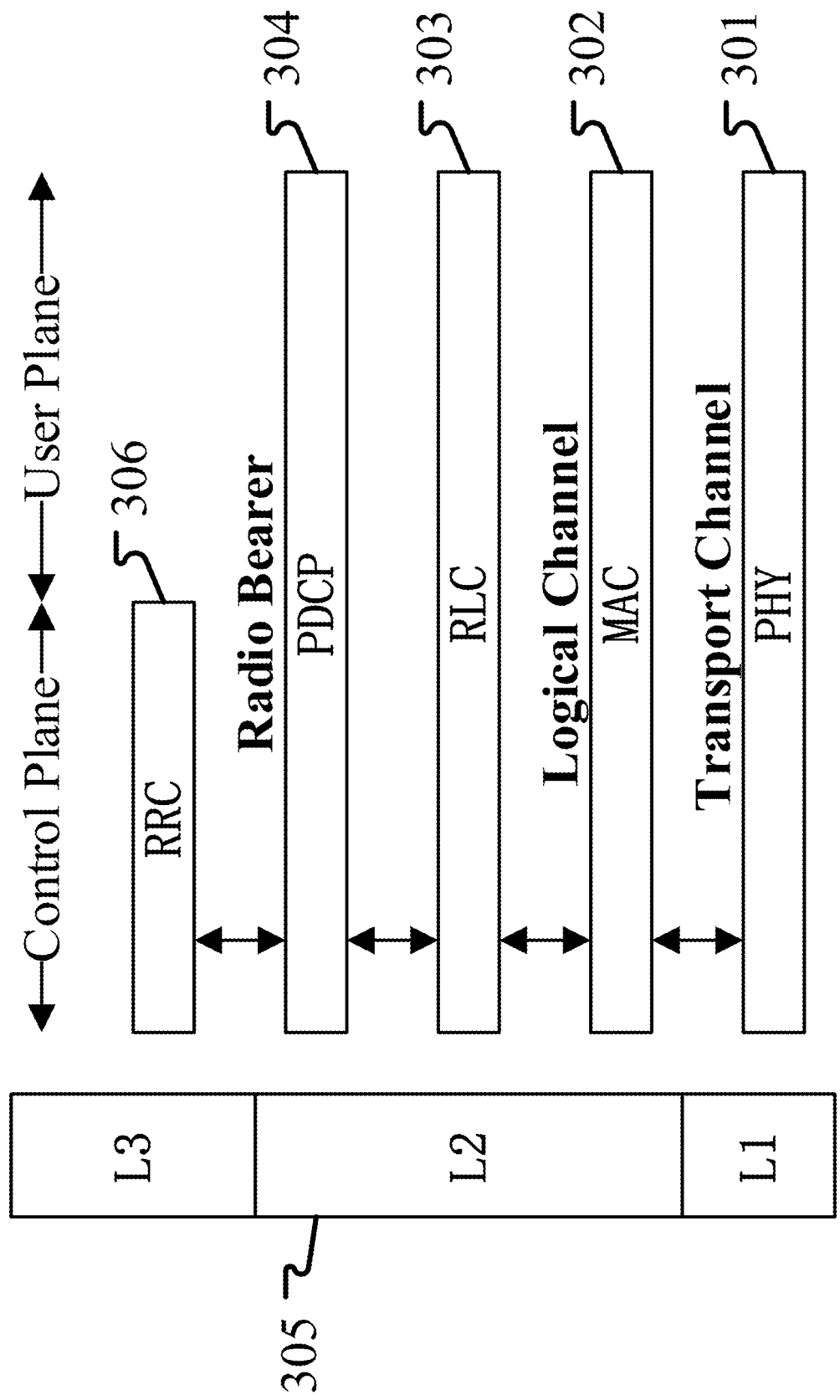
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first signaling in the present disclosure is generated by the MAC sublayer 302.

In one embodiment, the second signaling in the present disclosure is generated by the PHY 301.

In one embodiment, the second signaling in the present disclosure is generated by the MAC sublayer 302.

In one embodiment, the second signaling in the present disclosure is generated by the RRC sublayer 306.

In one embodiment, the first reporting information in the present disclosure is generated by the PHY 301.

In one embodiment, the first radio signal in the present disclosure is generated by the PHY 301.

In one embodiment, the first reference signal in the present disclosure is generated by the PHY 301.

In one embodiment, the second radio signal in the present disclosure is generated by the PHY 301.

In one embodiment, the first downlink information in the present disclosure is generated by the RRC sublayer 306.

In one embodiment, the second downlink information in the present disclosure is generated by the RRC sublayer 306.

In one embodiment, the first information in the present disclosure is generated by the PHY 301.

In one embodiment, the first information in the present disclosure is generated by the MAC sublayer 302.

In one embodiment, the first information in the present disclosure is generated by the RRC sublayer 306.

Embodiment 4

Figure 4:
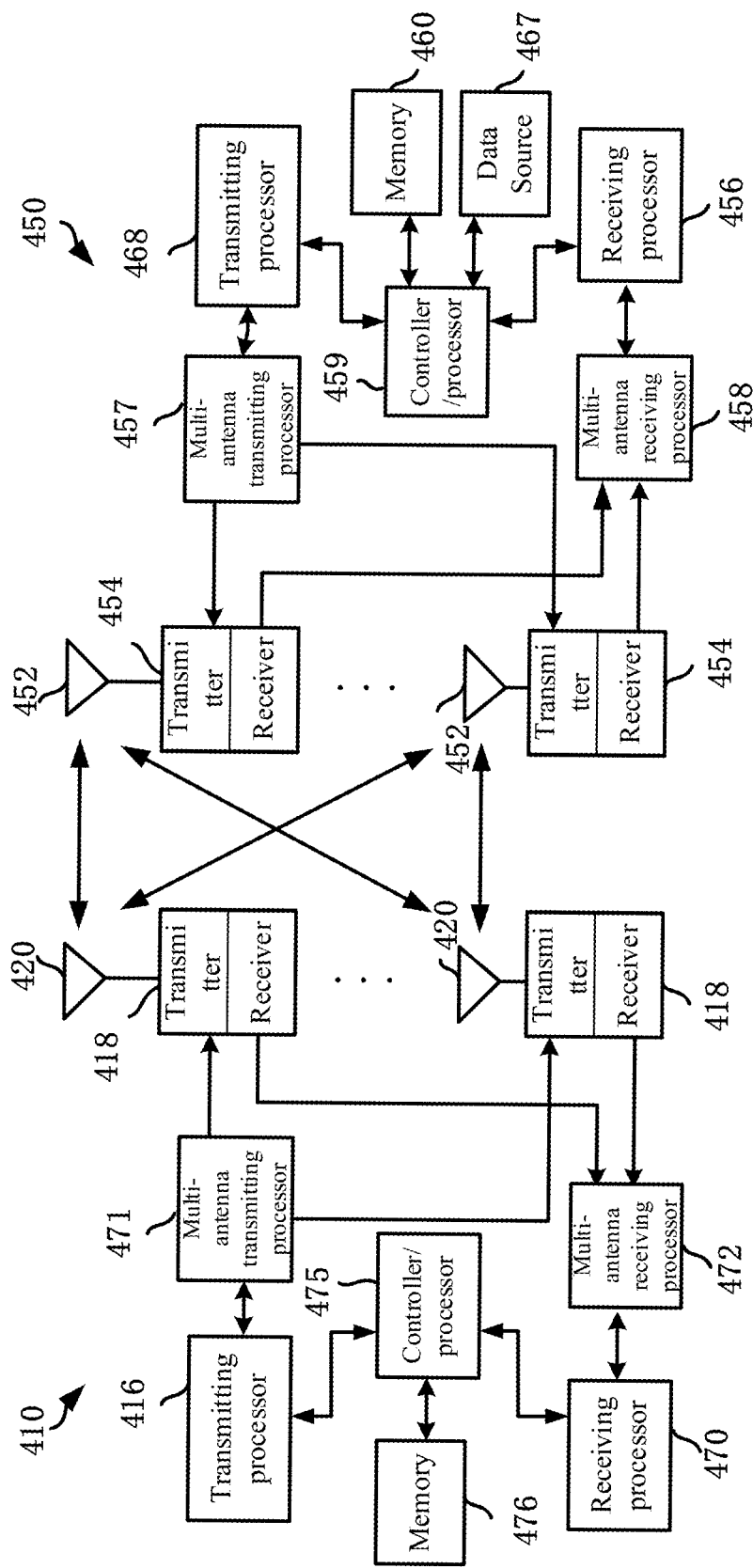
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding on the encoded and modulated symbols, including codebook-based precoding and non-codebook-based precoding, and beamforming processing to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least: receives the first signaling and the second signaling of the present disclosure; and transmits the first reporting information of the present disclosure in the target time-frequency resource of the present disclosure, the target time-frequency resource being one of the first time-frequency resource and the second time-frequency resource of the present disclosure. Wherein the first signaling and the second signaling are respectively used to determine the first antenna port group and the second antenna port group in the present disclosure; the first antenna port group and the second antenna port group are respectively applicable to the first time-frequency resource and the second time-frequency resource; an antenna port group comprises a positive integer number of antenna port(s); at least one of the following is used to determine the target time-frequency resource from the first time-frequency resource and the second time-frequency resource: the first antenna port group, the second antenna port group, the first time-frequency resource, the second time-frequency resource and the first information in the present disclosure; wherein the first information explicitly indicates the target time-frequency resource from the first time-frequency resource and the second time-frequency resource.

In one embodiment, the UE 450 comprises a memory that stores a computer readable instruction program. The computer readable instruction program generates an action when executed by at least one processor. The action includes: receiving the first signaling and the second signaling in the present disclosure; and transmitting the first reporting information of the present disclosure in the target time-frequency resource of the present disclosure, the target time-frequency resource being one of the first time-frequency resource and the second time-frequency resource in the present disclosure. Wherein the first signaling and the second signaling are respectively used to determine the first antenna port group and the second antenna port group of the present disclosure; the first antenna port group and the second antenna port group are respectively applicable to the first time-frequency resource and the second time-frequency resource; an antenna port group comprises a positive integer number of antenna port(s); at least one of the following is used to determine the target time-frequency resource from the first time-frequency resource and the second time-frequency resource: the first antenna port group, the second antenna port group, the first time-frequency resource, the second time-frequency resource and the first information in the present disclosure; wherein the first information explicitly indicates the target time-frequency resource from the first time-frequency resource and the second time-frequency resource.

In one embodiment, the gNB 410 comprises at least one processor and at least one memory, the at least one memory includes computer program codes; the at least one memory and the computer program codes are configured to be used in collaboration with the at least one processor. The gNB 410 at least: transmits the first signaling and the second signaling of the present disclosure; and receives the first reporting information of the present disclosure in the target time-frequency resource of the present disclosure, the target time-frequency resource being one of the first time-frequency resource and the second time-frequency resource in the present disclosure. Herein the first signaling and the second signaling are respectively used to determine the first antenna port group and the second antenna port group of the present disclosure; The first antenna port group and the second antenna port group are respectively applicable to the first time-frequency resource and the second time-frequency resource; an antenna port group comprises a positive integer number of antenna port(s); at least one of the following is used to determine the target time-frequency resource from the first time-frequency resource and the second time-frequency resource: the first antenna port group, the second antenna port group, the first time-frequency resource, the second time-frequency resource and the first information of the present disclosure; wherein the first information explicitly indicates the target time-frequency resource from the first time-frequency resource and the second time-frequency resource.

In one embodiment, the gNB 410 comprises a memory that stores a computer readable instruction program. The computer readable instruction program generates an action when executed by at least one processor. The action includes: transmitting the first signaling and the second signaling in the present disclosure; and receiving the first reporting information of the present disclosure in the target time-frequency resource of the present disclosure, the target time-frequency resource being one of the first time-frequency resource and the second time-frequency resource of the present disclosure. Herein the first signaling and the second signaling are respectively used to determine the first antenna port group and the second antenna port group of the present disclosure; the first antenna port group and the second antenna port group are respectively applicable to the first time-frequency resource and the second time-frequency resource; an antenna port group comprises a positive integer number of antenna port(s); at least one of the following is used to determine the target time-frequency resource from the first time-frequency resource and the second time-frequency resource: the first antenna port group, the second antenna port group, the first time-frequency resource, the second time-frequency resource and the first information in the present disclosure; wherein the first information explicitly indicates the target time-frequency resource from the first time-frequency resource and the second time-frequency resource.

In one embodiment, the gNB 410 corresponds to the base station in the present disclosure.

In one embodiment, the UE 450 corresponds to the UE in the present disclosure.

In one embodiment, at least one of the antenna 452, the receiver 454, the receiving processor 456, the multi-antenna receiving processor 458, the controller/processor 459, the memory 460, or the data source 467 is used for receiving the first signaling of the present disclosure; at least one of the antenna 420, the transmitter 418, the transmitting processor 416, the multi-antenna transmitting processor 471, the controller/processor 475, or the memory 476 is used for transmitting the first signaling of the present disclosure.

In one embodiment, at least one of the antenna 452, the receiver 454, the receiving processor 456, the multi-antenna receiving processor 458, the controller/processor 459, the memory 460, or the data source 467 is used for receiving the second signaling of the present disclosure; at least one of the antenna 420, the transmitter 418, the transmitting processor 416, the multi-antenna transmitting processor 471, the controller/processor 475, or the memory 476 is used for transmitting the second signaling of the present disclosure.

In one embodiment, at least one of the antenna 420, the receiver 418, the receiving processor 470, the multi-antenna receiving processor 472, the controller/processor 475, or the memory 476 is used to receive the first reporting information of the present disclosure in the target time-frequency resource of the present disclosure; at least one of the antenna 452, the transmitter 454, the transmitting processor 468, the multi-antenna transmitting processor 457, the controller/processor 459, the memory 460, or the data source 467 is used to transmit the first reporting information of the present disclosure in the target time-frequency resource of the present disclosure.

In one embodiment, at least one of the antenna 452, the receiver 454, the receiving processor 456, the multi-antenna receiving processor 458, the controller/processor 459, the memory 460, or the data source 467 is used for determining the target time-frequency resource of the present disclosure from the first time-frequency resource and the second time-frequency resource of the present disclosure.

In one embodiment, at least one of the antenna 452, the receiver 454, the receiving processor 456, the multi-antenna receiving processor 458, the controller/processor 459, the memory 460, or the data source 467 is used for receiving the first radio signal of the present disclosure; at least one of the antenna 420, the transmitter 418, the transmitting processor 416, the multi-antenna transmitting processor 471, the controller/processor 475, or the memory 476 is used for transmitting the first radio signal of the present disclosure.

In one embodiment, at least one of the antenna 452, the receiver 454, the receiving processor 456, the multi-antenna receiving processor 458, the controller/processor 459, the memory 460, or the data source 467 is used for receiving the first reference signal of the present disclosure; at least one of the antenna 420, the transmitter 418, the transmitting processor 416, the multi-antenna transmitting processor 471, the controller/processor 475, or the memory 476 is used for transmitting the first reference signal of the present disclosure.

In one embodiment, at least one of the antenna 420, the receiver 418, the receiving processor 470, the multi-antenna receiving processor 472, the controller/processor 475, or the memory 476 is used for receiving the second radio signal of the present disclosure in the first time-frequency resource of the present disclosure; at least one of the antenna 452, the transmitter 454, the transmitting processor 468, the multi-antenna transmitting processor 457, the controller/processor 459, the memory 460, or the data source 467 is used for transmitting the second radio signal of the present disclosure in the first time-frequency resource of the present disclosure.

In one embodiment, at least one of the antenna 452, the receiver 454, the receiving processor 456, the multi-antenna receiving processor 458, the controller/processor 459, the memory 460, or the data source 467 is used for receiving the first downlink information of the present disclosure; at least one of the antenna 420, the transmitter 418, the transmitting processor 416, the multi-antenna transmitting processor 471, the controller/processor 475, or the memory 476 is used for transmitting the first downlink information of the present disclosure.

In one embodiment, at least one of the antenna 452, the receiver 454, the receiving processor 456, the multi-antenna receiving processor 458, the controller/processor 459, the memory 460, or the data source 467 is used for receiving the second downlink information of the present disclosure; at least one of the antenna 420, the transmitter 418, the transmitting processor 416, the multi-antenna transmitting processor 471, the controller/processor 475, or the memory 476 is used for transmitting the second downlink information of the present disclosure.

In one embodiment, at least one of the antenna 452, the receiver 454, the receiving processor 456, the multi-antenna receiving processor 458, the controller/processor 459, the memory 460, or the data source 467 is used for receiving the first information of the present disclosure; at least one of the antenna 420, the transmitter 418, the transmitting processor 416, the multi-antenna transmitting processor 471, the controller/processor 475, or the memory 476 is used for transmitting the first information of the present disclosure.

Embodiment 5

Figure 5:
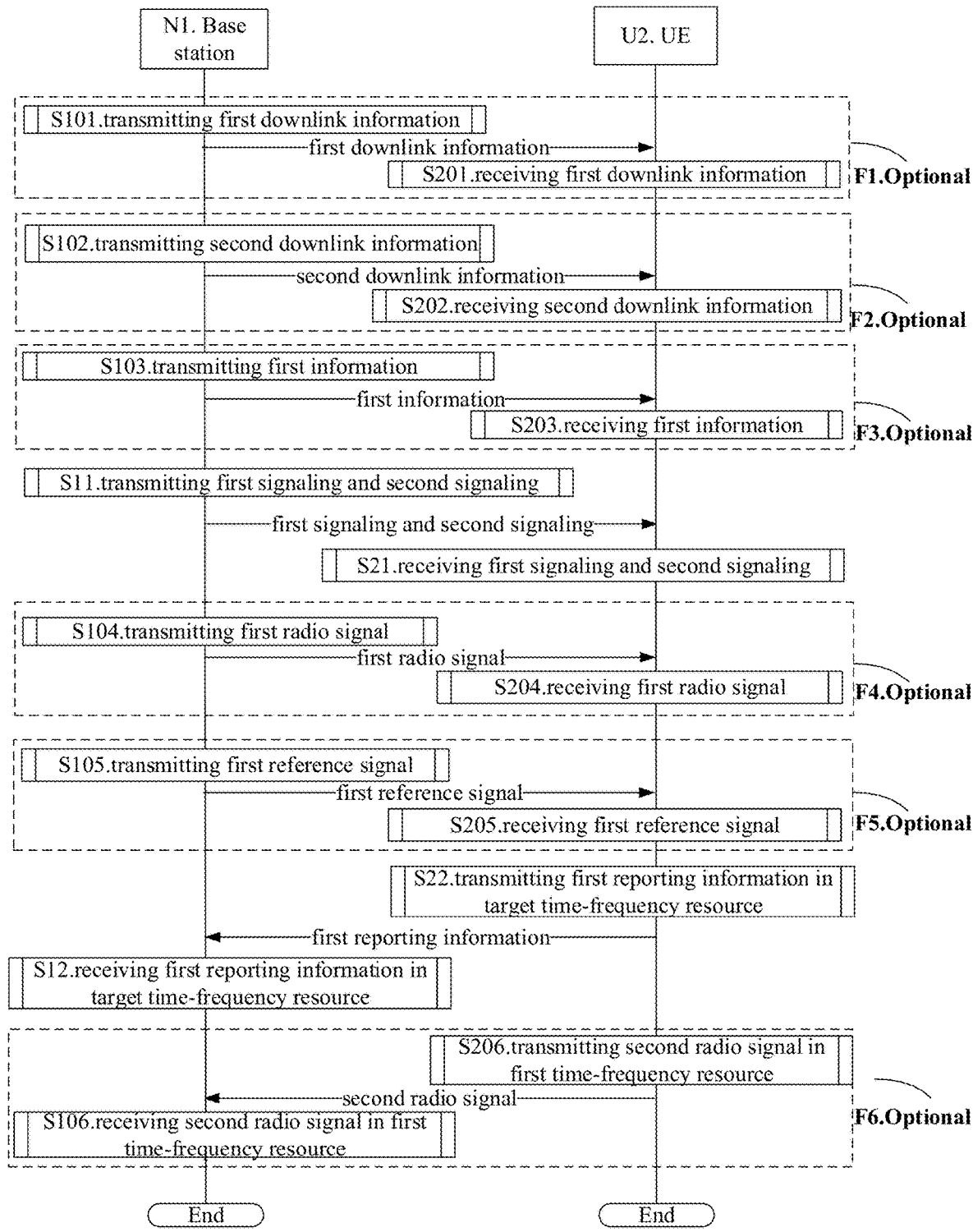
FIG. 5 illustrates a flowchart of wireless transmission according to one embodiment of the present disclosure.

Embodiment 5 illustrates a flow chart of wireless transmission, as shown in FIG. 5. In FIG. 5, a base station N1 is a maintenance base station for a serving cell of a UE U2. In FIG. 5, each step in block F1 to block F6 is optional.

The base station N1 transmits first downlink information in step S101; transmits second downlink information in step S102; transmits first information in step S103; transmits a first signaling and a second signaling in step S11; transmits a first radio signal in step S104; transmits a first reference signal in step S105; receives first reporting information in a target time-frequency resource in step S12; receives a second radio signal in a first time-frequency resource in step S106.

The U2 receives first downlink information in step S201; receives second downlink information in step S202; receives first information in step S203; receives a first signaling and a second signaling in step S21; receives a first radio signal in step S204; receives a first reference signal in step S205; transmits first reporting information in a target time-frequency resource in step S22; transmits a second radio signal in a first time-frequency resource in step S206.

In Embodiment 5, the target time-frequency resource is one of the first time-frequency resource and second time-frequency resource; the first signaling and the second signaling are respectively used by the U2 for determining a first antenna port group and a second antenna port group; the first antenna port group and the second antenna port group are respectively applicable to the first time-frequency resource and the second time-frequency resource; an antenna port group comprises a positive integer number of antenna port(s); at least one of the following is used by the U2 for determining the target time-frequency resource from the first time-frequency resource and the second time-frequency resource: the first antenna port group, the second antenna port group, the first time-frequency resource, the second time-frequency resource and the first information; wherein the first information explicitly indicates the target time-frequency resource from the first time-frequency resource and the second time-frequency resource. The first reporting information is used to indicate whether the first radio signal is correctly received. A measurement on the first reference signal is used by the U2 for determining the first reporting information. The first signaling comprises scheduling information of the second radio signal.

In one embodiment, the second signaling comprises scheduling information of the first radio signal.

In one subembodiment of the above embodiment, the scheduling information of the first radio signal comprises at least one of time domain resources occupied, frequency-domain resources occupied, a Modulation and Coding Scheme (MCS), configuration information of DMRS, a HARQ process number, a RV, an NDI, corresponding Spatial Tx parameters, or corresponding Spatial Rx parameters.

In one embodiment, the second signaling comprises configuration information of the first reference signal.

In one subembodiment of the above embodiment, the configuration information of the first reference signal comprises at least one of time-domain resources occupied, frequency-domain resources occupied, code-domain resources occupied, RS sequence, cyclic shift, Orthogonal Cover Code (OCC), corresponding Spatial Tx parameters, or corresponding Spatial Rx parameters.

In one embodiment, the second radio signal comprises uplink data.

In one embodiment, scheduling information of the second radio signal comprises at least one of time domain resources occupied, frequency-domain resources occupied, a Modulation and Coding Scheme (MC S), configuration information of DMRS, a HARQ process number, a RV, an NDI, corresponding Spatial Tx parameters, or corresponding Spatial Rx parameters.

In one embodiment, the first antenna port group is used by the U2 to determine the transmission antenna port of the second radio signal.

In one embodiment, the second radio signal is transmitted by all or part of antenna ports of the first antenna port group.

In one embodiment, at least one transmission antenna port of the second radio signal and at least one antenna port of the first antenna port group are QCL.

In one embodiment, a transmission antenna port group of the second radio signal is used to determine the target time-frequency resource from the first time-frequency resource and the second time-frequency resource.

In one embodiment, the first downlink information indicates N1 port group sets, the N1 being a positive integer greater than 1, and a port group set comprises a positive integer number of antenna port group(s); if the first antenna port group and the second antenna port group belong to a same port group set among the N1 port group sets, the target time-frequency resource is the first time-frequency resource, otherwise the target time-frequency resource is the second time-frequency resource.

In one embodiment, the first downlink information is carried by a higher-layer signaling.

In one embodiment, the first downlink information is carried by a Radio Resource Control (RRC) signaling.

In one embodiment, the first downlink information is carried by a MAC CE signaling.

In one embodiment, the first downlink information explicitly indicates the N1 port group sets.

In one embodiment, the first downlink information implicitly indicates the N1 port group sets.

In one embodiment, the second downlink information indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource.

In one embodiment, the second downlink information is carried by a higher-layer signaling.

In one embodiment, the second downlink information is carried by a Radio Resource Control (RRC) signaling.

In one embodiment, the second downlink information is carried by a MAC CE signaling.

In one embodiment, the second downlink information explicitly indicates the N2 time-frequency resource pools.

In one embodiment, the second downlink information implicitly indicates the N2 time-frequency resource pools.

In one embodiment, the target time-frequency resource is independent of a signaling format of the first signaling and a signaling format of the second signaling.

In one embodiment, the signaling format of the first signaling refers to a DCI format corresponding to the first signaling.

In one embodiment, the signaling format of the first signaling is one of Format 0_0 or Format 0_1, and the specific meaning of the Format 0_0 and the Format 0_1 can be found in 3GPP TS38.212, chapter 7.3.

In one embodiment, the signaling format of the first signaling is one of Format 0, Format 0A, Format 0B, Format 0C, Format 4, Format 4A, Format 4B, Format 6-0A, Format 6-0B, Format 7-0A, or Format 7-0B, and the specific meaning of the Format 0, the Format 0A, the Format 0B, the Format 0C, the Format 4, the Format 4A, the Format 4B, the Format 6-0A, the Format 6-0B, the Format 7-0A, and the Format 7-0B can be found in 3GPP TS36.212, chapter 5.3.3.

In one embodiment, the signaling format of the second signaling refers to: a DCI format corresponding to the second signaling.

In one embodiment, the signaling format of the second signaling is one of Format 1_0 or Format 1_1, and the specific meaning of the Format 1_0 and the Format 1_1 can be found in 3GPP TS38.212, chapter 7.3.

In one embodiment, the signaling format of the second signaling is one of Format 1, Format 1A, Format 1B, Format 1C, Format 1D, Format 2, Format 2A, Format 2B, Format 2C, Format 2D, Format 6-1A, Format 6-1B, Format 7-1A, Format 7-1B, Format 7-1C, Format 7-1D, Format 7-1E, Format 7-1F or Format 7-1G. The specific meaning of the Format 1, the Format 1A, the Format 1B, the Format 1C, the Format 1D, the Format 2, the Format 2A, the Format 2B, the Format 2C, the Format 2D, the Format 6-1A, the Format 6-1B, the Format 7-1A, the Format 7-1B, the Format 7-1C, the Format 7-1D, the Format 7-1E, the Format 7-1F and the Format 7-1G can be found in 3GPP TS36.212, chapter 5.3.3.

In one embodiment, whether the target time-frequency resource is the first time-frequency resource or the second time-frequency resource is independent of a signaling format of the first signaling and a signaling format of the second signaling.

In one embodiment, the first signaling is transmitted on a downlink physical layer control channel (i.e., a downlink channel that can only be used for bearing a physical layer signaling).

In one subembodiment of the embodiment, the downlink physical layer control channel is a Physical Downlink Control CHannel (PDCCH).

In one subembodiment of the above embodiment, the downlink physical layer control channel is an Enhanced PDCCH (EPDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, the second signaling is transmitted on a downlink physical layer control channel (i.e., a downlink channel that can only be used for bearing a physical layer signaling).

In one subembodiment of the above embodiment, the downlink physical layer control channel is a PDCCH.

In one subembodiment of the above embodiment, the downlink physical layer control channel is an EPDCCH.

In one subembodiment of the above embodiment, the downlink physical layer control channel is an sPDCCH.

In one subembodiment of the above embodiment, the downlink physical layer control channel is an NR-PDCCH.

In one subembodiment of the above embodiment, the downlink physical layer control channel is an NB-PDCCH.

In one embodiment, the second signaling is transmitted on a downlink physical layer data channel (i.e., a downlink channel can be used for bearing physical layer data).

In one subembodiment of the above embodiment, the downlink physical layer data channel is a Physical Downlink Shared CHannel (PDSCH).

In one subembodiment of the above embodiment, the downlink physical layer data channel is a short PDSCH (sPDSCH).

In one subembodiment of the above embodiment, the downlink physical layer data channel is a New Radio PDSCH (NR-PDSCH).

In one subembodiment of the above embodiment, the downlink physical layer data channel is a Narrow Band PDSCH (NB-PDSCH).

In one embodiment, if the target time-frequency resource is the first time-frequency resource, the first reporting information is transmitted on an uplink physical layer data channel (i.e., an uplink channel that can be used for bearing physical layer data).

In one subembodiment of the above embodiment, the uplink physical layer data channel is a Physical Uplink Shared CHannel (PUSCH).

In one subembodiment of the above embodiment, the uplink physical layer data channel is a short Physical Uplink Shared Channel (sPUSCH).

In one subembodiment of the above embodiment, the uplink physical layer data channel is a New Radio PUSCH (NR-PUSCH).

In one subembodiment of the above embodiment, the uplink physical layer data channel is a Narrow Band PUSCH (NB-PUSCH).

In one embodiment, if the target time-frequency resource is the second time-frequency resource, the first reporting information is transmitted on an uplink physical layer control channel (i.e., an uplink channel that can only be used for bearing a physical layer signaling).

In one subembodiment of the above embodiment, the uplink physical layer control channel is a Physical Uplink Control CHannel (PUCCH).

In one subembodiment of the above embodiment, the uplink physical layer control channel is a short PUCCH (sPUCCH).

In one subembodiment of the above embodiment, the uplink physical layer control channel is a New Radio PUCCH (NR-PUCCH).

In one subembodiment of the above embodiment, the uplink physical layer control channel is a Narrow Band PUCCH (NB-PUCCH).

In one embodiment, the first radio signal is transmitted on a downlink physical layer data channel (i.e., a downlink channel can be used for bearing physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, a transmission channel corresponding to the first radio signal is a Downlink Shared Channel (DL-SCH).

In one embodiment, the second radio signal is transmitted on an uplink physical layer data channel (i.e., an uplink channel can be used for bearing physical layer data).

In one subembodiment of the above embodiment, the uplink physical layer data channel is a PUSCH.

In one subembodiment of the above embodiment, the uplink physical layer data channel is a sPUSCH.

In one subembodiment of the above embodiment, the uplink physical layer data channel is an NR-PUSCH.

In one subembodiment of the above embodiment, the uplink physical layer data channel is an NB-PUSCH.

In one embodiment, the first downlink information is transmitted on a downlink physical layer data channel (i.e., a downlink channel that can be used for bearing physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the second downlink information is transmitted on a downlink physical layer data channel (i.e., a downlink channel that can be used for bearing physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the first information is transmitted on a downlink physical data channel (i.e., a downlink channel that can be used for bearing physical layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, the first information is transmitted on a downlink physical layer control channel (i.e., a downlink channel that can only be used for bearing a physical layer signaling).

In one subembodiment of the above embodiment, the downlink physical layer control channel is a PDCCH.

In one subembodiment of the above embodiment, the downlink physical layer control channel is an EPDCCH.

In one subembodiment of the above embodiment, the downlink physical layer control channel is an sPDCCH.

In one subembodiment of the above embodiment, the downlink physical layer control channel is an NR-PDCCH.

In one subembodiment of the above embodiment, the downlink physical layer control channel is an NB-PDCCH.

Embodiment 6

Figure 6:
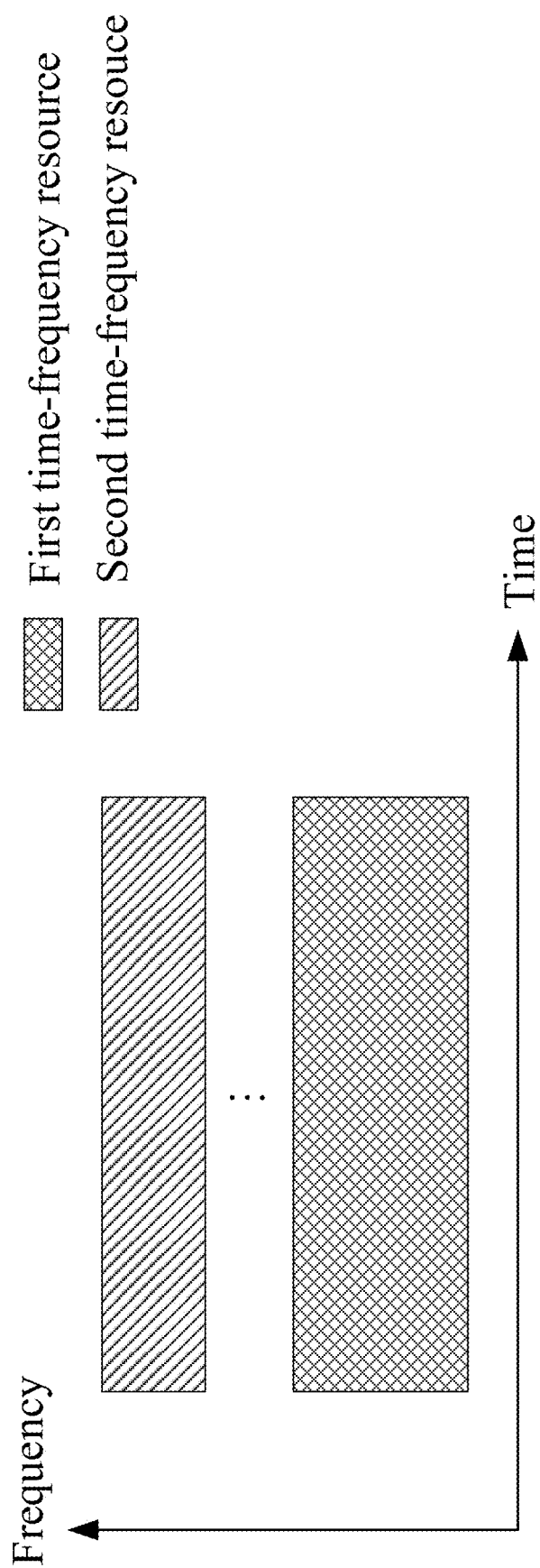
FIG. 6 illustrates a schematic diagram of resources mapping of a first time-frequency resource and a second time-frequency resource in time-frequency domain according to one embodiment of the present disclosure.

Embodiment 6 illustrates a schematic diagram of resources mapping of a first time-frequency resource and a second time-frequency resource in time-frequency domain, as shown in FIG. 6.

In Embodiment 6, the first time-frequency resource and the second time-frequency resource comprise a positive integer number of Resource Elements (RE). The UE in the present disclosure determines the target time-frequency resource in the present disclosure from the first time-frequency resource and the second time-frequency resource. In FIG. 6, a box filled with cross lines represents the first time-frequency resource, and a box filled with left slashes represents the second time-frequency resource.

In one embodiment, the first time-frequency resource and the second time-frequency resource occupy same time resources in time domain.

In one embodiment, time resources occupied by the first time-frequency resource is located within time resources occupied by the second time-frequency resource.

In one embodiment, the first time-frequency resource and the second time-frequency resource occupy frequency resources that are mutually orthogonal (not overlapping).

In one embodiment, the first time-frequency resource is composed of a positive integer number of RE(s).

In one embodiment, the first time-frequency resource comprises a positive integer number of multi-carrier symbol(s) in time domain.

In one embodiment, the first time-frequency resource comprises a positive integer number of consecutive multi-carrier symbols in time domain.

In one embodiment, the first time-frequency resource comprises a positive integer number of sub-carrier(s) in frequency domain.

In one embodiment, the first time-frequency resource comprises a positive integer number of Physical Resource Block(s) (PRB) in frequency domain.

In one embodiment, the first time-frequency resource comprises a positive integer number of consecutive PRBs in frequency domain.

In one embodiment, the first time-frequency resource comprises a positive integer number of Resource Block(s) (RB) in frequency domain.

In one embodiment, the first time-frequency resource comprises a positive integer number of consecutive RBs in frequency domain.

In one embodiment, the second time-frequency resource is composed of a positive integer number of RE(s).

In one embodiment, the second time-frequency resource comprises a positive integer number of multi-carrier symbol(s) in time domain.

In one embodiment, the second time-frequency resource comprises a positive integer number of consecutive multi-carrier symbols in time domain.

In one embodiment, the second time-frequency resource comprises a positive integer number of sub-carrier(s) in frequency domain.

In one embodiment, the second time-frequency resource comprises a positive integer number of PRB(s) in frequency domain.

In one embodiment, the second time-frequency resource comprises a positive integer number of consecutive PRBs in frequency domain.

In one embodiment, the second time-frequency resource comprises a positive integer number of RB(s) in frequency domain.

In one embodiment, the second time-frequency resource comprises a positive integer number of consecutive RBs in frequency domain.

In one embodiment, a RE occupies a multicarrier symbol in time domain, and a subcarrier in frequency domain.

In one embodiment, a multicarrier symbol is an Orthogonal Frequency Division Multiplexing (OFDM) symbol.

In one embodiment, a multicarrier symbol is a Single Carrier-Frequency Division Multiple Access (SC-FDMA) symbol.

Embodiment 7

Figure 7:
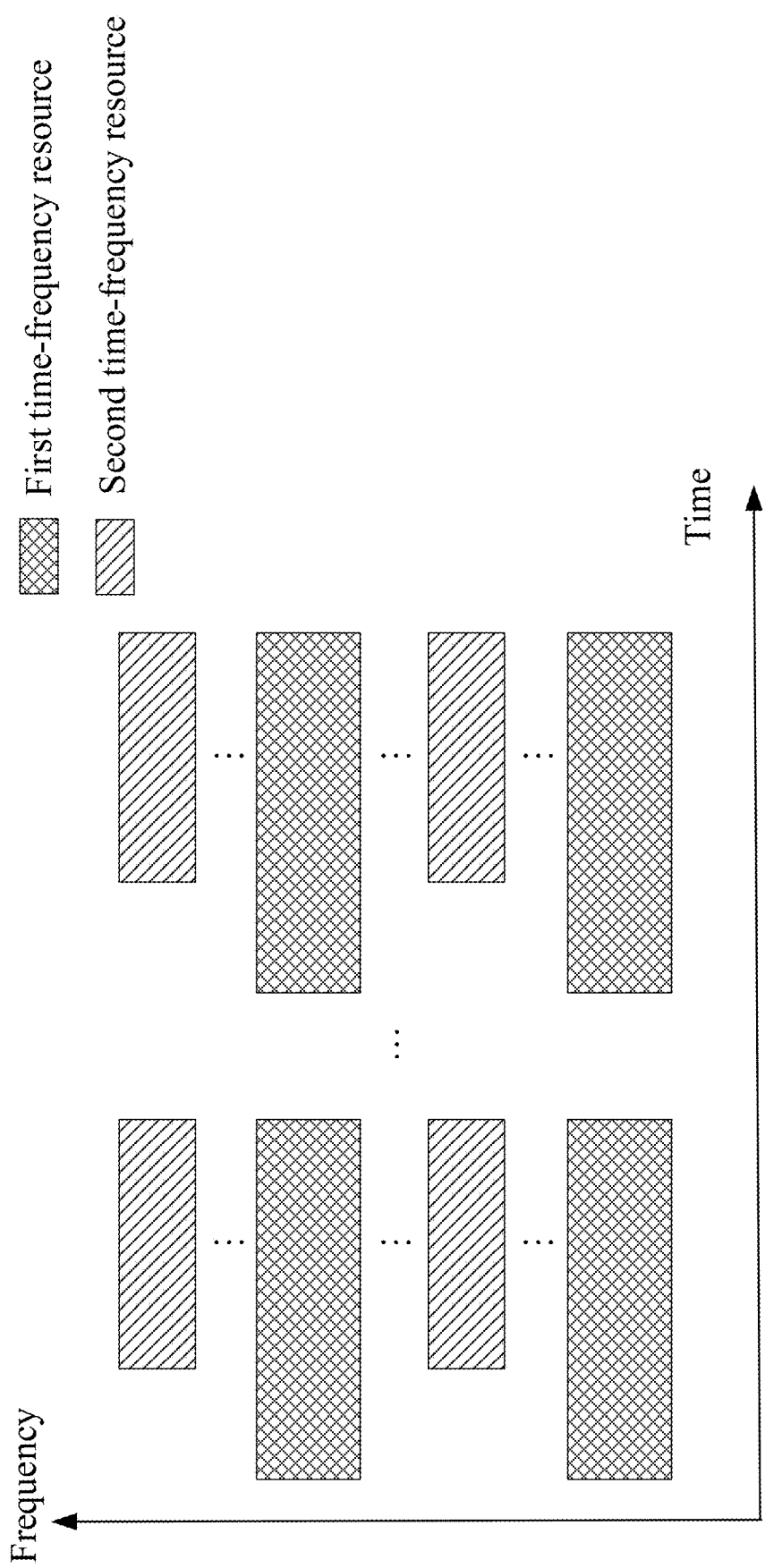
FIG. 7 illustrates a schematic diagram of resources mapping of a first time-frequency resource and a second time-frequency resource in time-frequency domain according to one embodiment of the present disclosure.

Embodiment 7 illustrates a schematic diagram of resources mapping of a first time-frequency resource and a second time-frequency resource in time-frequency domain, as shown in FIG. 7.

In Embodiment 7, the first time-frequency resource and the second time-frequency resource comprise a positive integer number of RE(s). The UE in the present disclosure determines the target time-frequency resource in the present disclosure from the first time-frequency resource and the second time-frequency resource. In FIG. 7, a box filled with cross lines represents the first time-frequency resource, and a box filled with left slashes represents the second time-frequency resource.

In one embodiment, time resources occupied by the first time-frequency resource partially overlap with time resources occupied by the second time-frequency resource.

In one embodiment, time resources occupied by the second time-frequency resource is located within time resources occupied by the first time-frequency resource.

In one embodiment, the first time-frequency resource comprises a positive integer number of non-consecutive multi-carrier symbols in time domain.

In one embodiment, the first time-frequency resource comprises a positive integer number of non-consecutive PRBs in frequency domain.

In one embodiment, the first time-frequency resource comprises a positive integer number of non-consecutive RBs in frequency domain.

In one embodiment, the second time-frequency resource comprises a positive integer number of non-consecutive multi-carrier symbols in time domain.

In one embodiment, the second time-frequency resource comprises a positive integer number of non-consecutive PRBs in frequency domain.

In one embodiment, the second time-frequency resource comprises a positive integer number of non-consecutive RBs in frequency domain.

Embodiment 8

Figure 8:
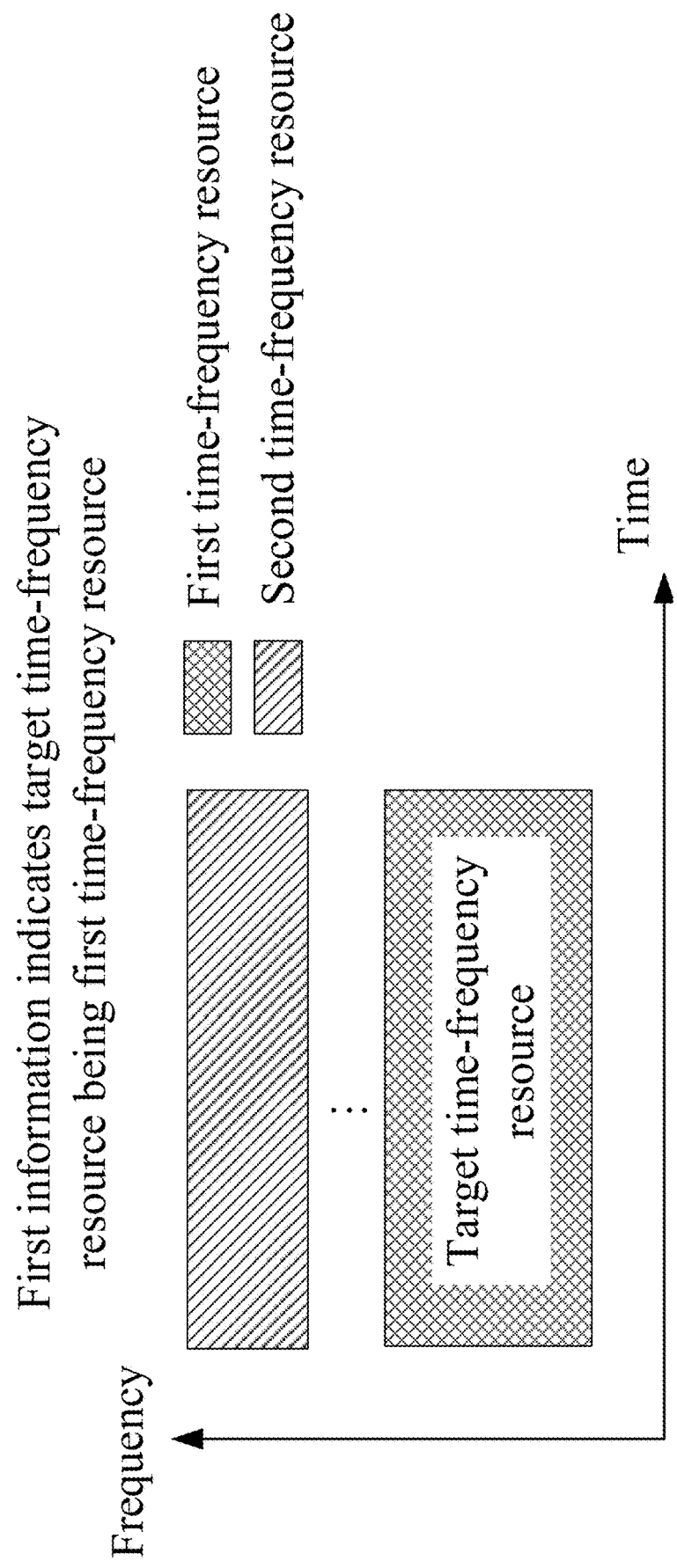
FIG. 8 illustrates a schematic diagram of first information indicating a target time-frequency resource from a first time-frequency resource and a second time-frequency resource according to one embodiment of the present disclosure.

Embodiment 8 illustrates a schematic diagram of first information indicating a target time-frequency resource from a first time-frequency resource and a second time-frequency resource, as shown in FIG. 8.

In Embodiment 8, the first information explicitly indicates that the target time-frequency resource is the first time-frequency resource among the first time-frequency resource and the second time-frequency resource. In FIG. 8, a box filled with cross lines represents the first time-frequency resource, and a box filled with left slashes represents the second time-frequency resource.

In one embodiment, the target time-frequency resource is the first time-frequency resource.

In one embodiment, the first information is carried by a higher-layer signaling.

In one embodiment, the first information is carried by a Radio Resource Control (RRC) signaling.

In one embodiment, the first information is beard by a physical layer signaling.

In one embodiment, the first information is jointly carried by a higher-layer signaling and a physical layer signaling.

In one embodiment, the first information is carried by the first signaling in the present disclosure.

In one embodiment, the first information is carried by the second signaling in the present disclosure.

In one embodiment, the first information is carried by a signaling other than the first signaling and the second signaling.

In one embodiment, the first information comprises a bit, when the bit comprised in the first information is equal to 0, the target time-frequency resource is the first time-frequency resource; when the bit comprised in the first information is equal to 1, the target time-frequency resource is the second time-frequency resource.

In one subembodiment of the above embodiment, in FIG. 8, a bit comprised in the first information is equal to 0.

Embodiment 9

Figure 9:
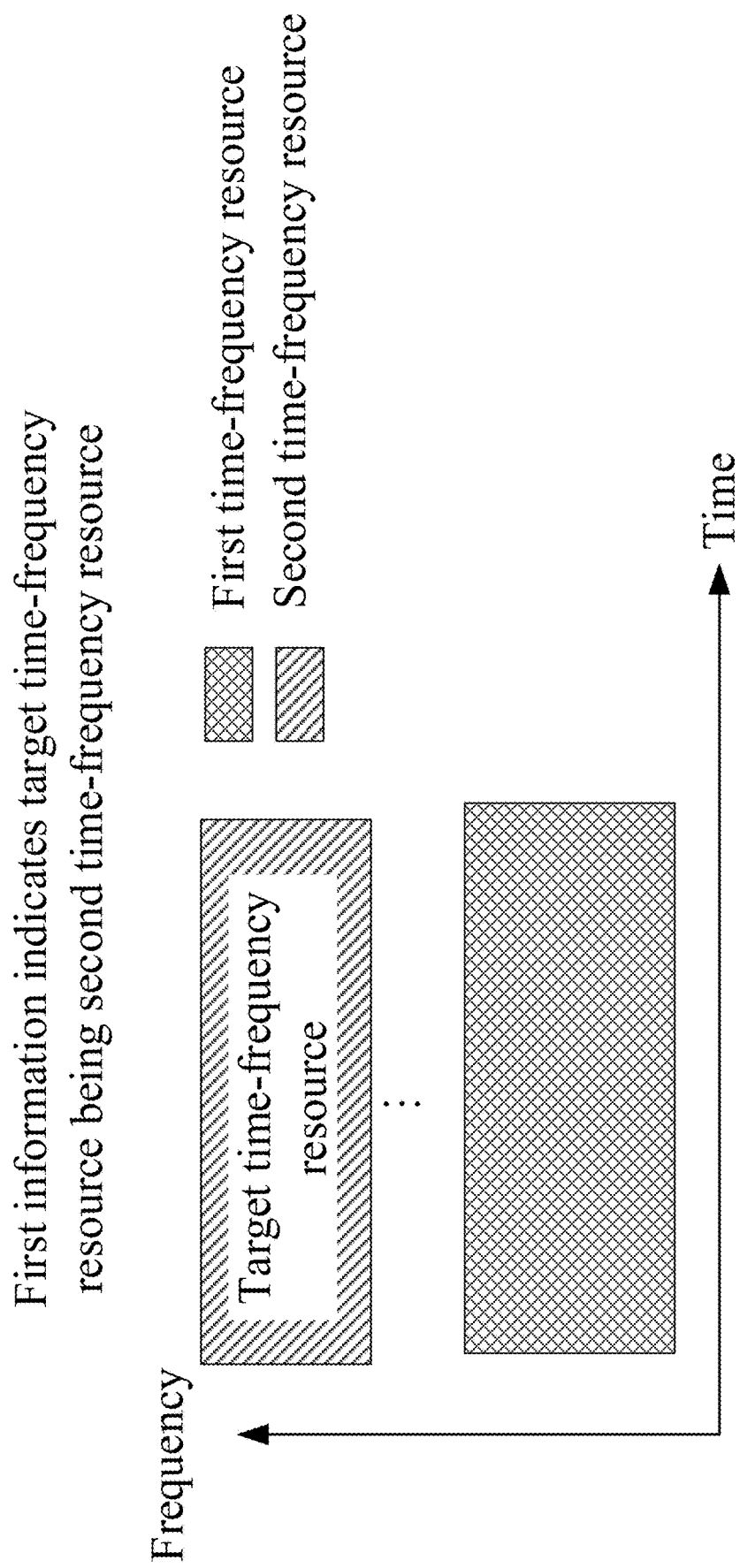
FIG. 9 illustrates a schematic diagram of first information indicating a target time-frequency resource from a first time-frequency resource and a second time-frequency resource according to one embodiment of the present disclosure.

Embodiment 9 illustrates a schematic diagram of first information indicating a target time-frequency resource from a first time-frequency resource and a second time-frequency resource, as shown in FIG. 9.

In Embodiment 9, the first information explicitly indicates that the target time-frequency resource is the second time-frequency resource among the first time-frequency resource and the second time-frequency resource. In FIG. 9, a box filled with cross lines represents the first time-frequency resource, and a box filled with left slashes represents the second time-frequency resource.

In one embodiment, the target time-frequency resource is second first time-frequency resource.

In one embodiment, the first information comprises a bit, when the bit comprised in the first information is equal to 1, the target time-frequency resource is the first time-frequency resource; when the bit comprised in the first information is equal to 0, the target time-frequency resource is the second time-frequency resource.

In one subembodiment of the above embodiment, in FIG. 9, a bit comprised in the first information is equal to 0.

Embodiment 10

Figure 10:
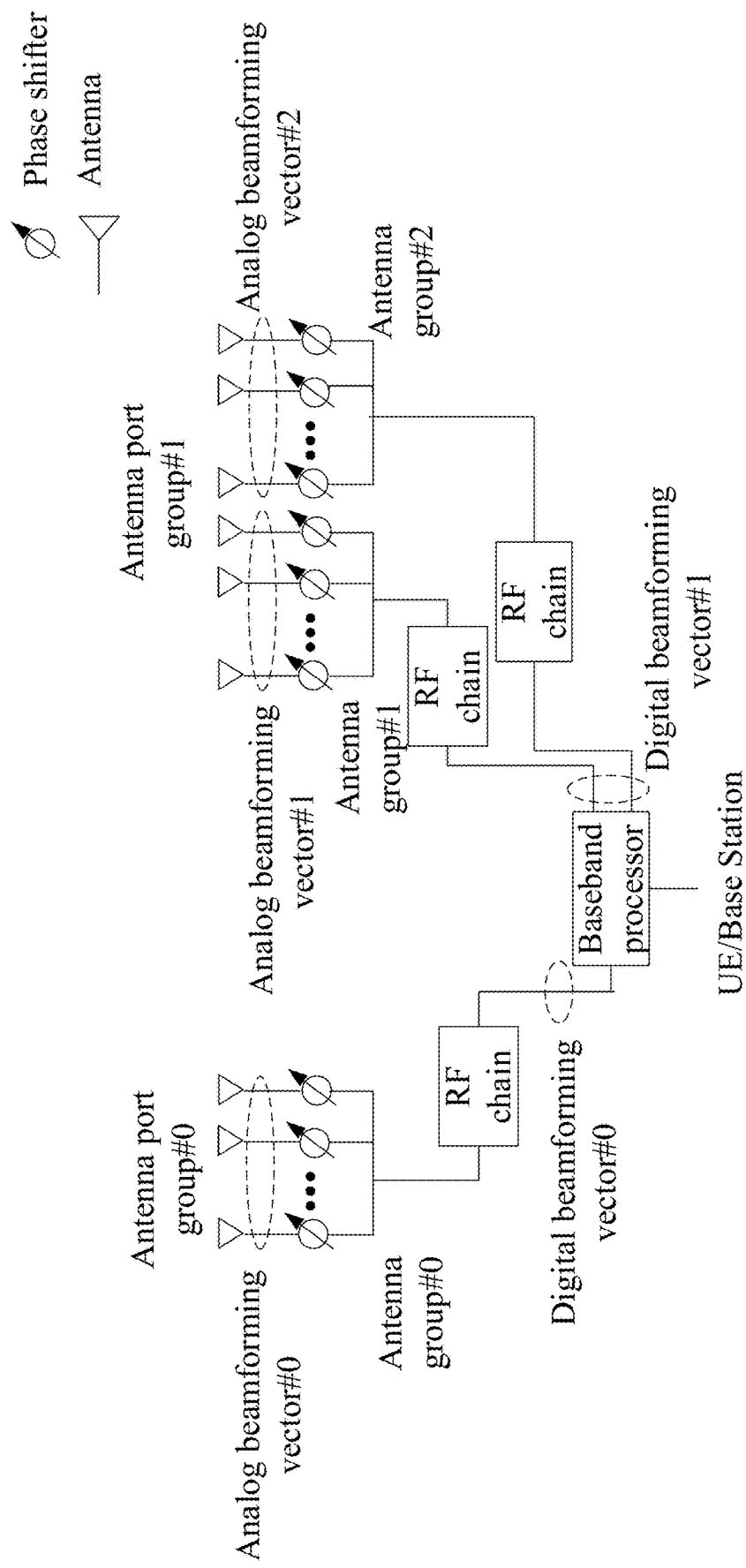
FIG. 10 illustrates a schematic diagram of antenna ports and antenna port sets according to one embodiment of the present disclosure.

Embodiment 10 illustrates a schematic diagram of an antenna port and an antenna port group, as shown in FIG. 10.

In Embodiment 10, an antenna port group comprises a positive integer number of antenna port(s); an antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute an analog beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) comprised in the given antenna port are arranged diagonally to form an analog beamforming matrix corresponding to the given antenna port. Mapping coefficients from the positive integer number of antenna group(s) comprised in the given antenna port to the given antenna port constitute a digital beamforming vector corresponding to the given antenna port. A beamforming vector corresponding to the given antenna port is acquired as a product of the analog beamforming matrix and the digital beamforming vector corresponding to the given antenna port. Different antenna ports in an antenna port group are composed of a same antenna group, and different antenna ports in a same antenna port group correspond to different beamforming vectors.

FIG. 10 illustrates two antenna port groups, namely, antenna port group #0 and antenna port group #1. Herein, the antenna port group #0 consists of antenna group #0, and the antenna port group #1 consists of antenna group #1 and antenna group #2. Mapping coefficients from multiple antennas of the antenna group #0 to an antenna port of the antenna port group #0 constitute an analog beamforming vector #0, and mapping coefficients from the antenna group #0 to one antenna port of the antenna port group #0 constitute a digital beamforming vector #0. Mapping coefficients from multiple antennas of the antenna group #1 and multiple antennas of the antenna group #2 to an antenna port in the antenna port group #1 respectively constitute an analog beamforming vector #1 and an analog beamforming vector #2, and mapping coefficients from the antenna group #1 and the antenna group #2 to an antenna port of the antenna port group #1 constitute a digital beamforming vector #1. A beamforming vector corresponding to one antenna port of the antenna port group #0 is acquired as a product of the analog beamforming vector #0 and the digital beamforming vector #0. A beamforming vector corresponding to an antenna port of the antenna port group #1 is acquired as a product of an analog beamforming matrix formed by the analog beamforming vector #1 and the analog beamforming vector #2 arranged diagonally and the digital beamforming vector #1.

In one embodiment, an antenna port group only comprises one antenna group, i.e., one RF chain, for instance, the antenna port group #0 in FIG. 10.

In one subembodiment of the above embodiment, an analog beamforming matrix corresponding to an antenna port of the one antenna port group is subjected to dimensionality reduction to form an analog beamforming vector, and a digital beamforming vector corresponding to an antenna port of the one antenna port group is subjected to dimensionality reduction to form a scaler; a beamforming vector corresponding to an antenna port of the one antenna port group is equal to an analog beamforming vector corresponding thereto. For example, the antenna port group #0 in FIG. 10 only comprises the antenna port group #0, the digital beamforming vector #0 in FIG. 10 is subjected to dimensionality reduction to form a scaler, a beamforming vector corresponding to an antenna port of the antenna port group #0 is the analog beamforming vector #0.

In one subembodiment of the above embodiment, the one antenna port group comprises one antenna port.

In one embodiment, one antenna port group comprises a plurality of antenna groups, that is, a plurality of RF chains, for example, the antenna port group #1 in FIG. 10.

In one subembodiment of the above embodiment, the antenna port group includes a plurality of antenna ports.

In one subembodiment of the above embodiment, different antenna ports of the one antenna port group correspond to a same analog beamforming matrix.

In one subembodiment of the above embodiment, different antenna ports of the one antenna port group correspond to different digital beamforming vectors.

In one embodiment, antenna ports in different antenna port groups correspond to different analog beamforming matrices.

In one embodiment, a small-scale channel parameter that a radio signal transmitted from one antenna port goes through can be used to infer that of another radio signal transmitted from the antenna port goes through.

In one subembodiment of the above embodiment, the small-scale channel parameter includes one or more of Channel Impulse Response (CIR), a Precoding Matrix Indicator (PMI), a Channel Quality Indicator (CQI), and a Rank Indicator (RI).

In one embodiment, any two antenna ports of one antenna port group are QCL.

In one embodiment, the specific meaning of the QCL can be found in 3GPP TS38.214, chapter 5.1.5.

In one embodiment, the phrase that one antenna port and another antenna port are QCL refers to: all or part of large-scale properties of a radio signal transmitted by the one antenna port can be used to infer all or part of large-scale properties of a radio signal transmitted by the another antenna port.

In one embodiment, the large-scale properties of a radio signal include one or more of delay spread, Doppler spread, Doppler shift, path loss, average gain, average delay, spatial Rx parameters, and spatial Tx parameters.

In one embodiment, Spatial Rx parameters include one or more of a receiving beam, a receiving analog beamforming matrix, a receiving analog beamforming vector, a receiving beamforming vector, a receiving spatial filter and a spatial domain reception filter.

In one embodiment, Spatial Tx parameters include one or more of a transmission antenna port, a transmission antenna port group, a transmitting beam, a transmitting analog beamforming matrix, a transmitting analog beamforming vector, a transmitting beamforming vector, a transmitting spatial filter, and a spatial domain transmission filter.

In one embodiment, the phrase that one antenna port and another antenna port are QCL refers to: the one antenna port and the another antenna port at least have a same QCL parameter.

In one embodiment, the QCL parameter includes: one or more of delay spread, Doppler spread, Doppler shift, path loss, average gain, average delay, Spatial Rx parameters, and Spatial Tx parameters.

In one embodiment, the phrase that one antenna port and another antenna port are QCL refers to: at least one QCL parameter of the another antenna port can be inferred from at least one QCL parameter of the one antenna port.

In one embodiment, the first antenna port group only comprises one antenna port.

In one embodiment, the first antenna port group comprises multiple antenna ports.

In one embodiment, the second antenna port group only comprises one antenna port.

In one embodiment, the second antenna port group comprises multiple antenna ports.

Embodiment 11

Figure 11:
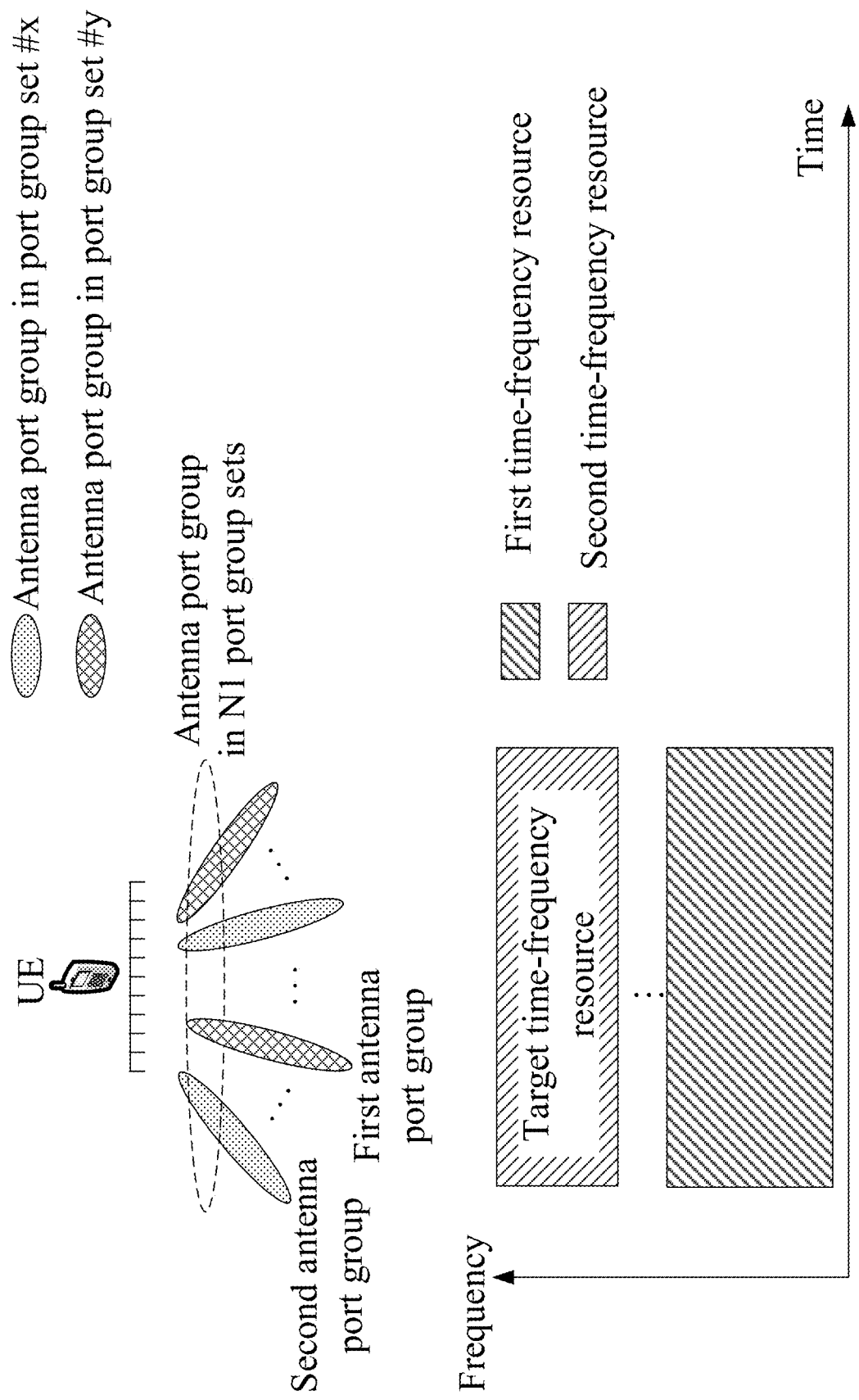
FIG. 11 illustrates a schematic diagram of a first antenna port group and a second antenna port group being used to determine a target time-frequency resource from a first time-frequency resource and a second time-frequency resource according to one embodiment of the present disclosure.

Embodiment 11 illustrates a schematic diagram of a first antenna port group and a second antenna port group being used to determine a target time-frequency resource from a first time-frequency resource and a second time-frequency resource, as shown in FIG. 11.

In Embodiment 11, the first downlink information in the present disclosure indicates N1 port group sets, the N1 being a positive integer greater than 1, and a port group set comprises a positive integer number of antenna port group(s). If the first antenna port group and the second antenna port group belong to a same port group set among the N1 port group sets, the target time-frequency resource is the first time-frequency resource, otherwise the target time-frequency resource is the second time-frequency resource. In FIG. 11, an ellipse represents one antenna port group comprised in the N1 port group sets; an ellipse filled with small dots represents antenna port groups comprised in a port group set #x of the N1 port group sets, and an ellipse filled with cross lines represents an antenna port group comprised in a port group set #y of the N1 port group sets, herein the x and the y are respectively non-negative integers less than the N1-1, the x being not equal to the y; a box filled with right slashes represents the first time-frequency resource; a box filled with left slashes represents the second time-frequency resource.

In Embodiment 11, the first antenna port group and the second antenna port group respectively belong to a port group set #x and a port group set #y in the N1 port group sets, and the target time-frequency resource is the second time-frequency resource among the first time-frequency resource and the second time-frequency resource.

In one embodiment, the first antenna port group and the second antenna port group indicate the target time-frequency resource from the first time-frequency resource and the second time-frequency resource.

In one embodiment, the first antenna port group and the second antenna port group implicitly indicate the target time-frequency resource from the first time-frequency resource and the second time-frequency resource.

In one embodiment, the N1 is equal to 2.

In one embodiment, the N1 is greater than 2.

In one embodiment, at least one of the N1 port group sets only comprises one antenna port group.

In one embodiment, at least one of the N1 port group sets comprises multiple antenna port groups.

In one embodiment, if the first antenna port group and the second antenna port group don't belong to a same port group set among the N1 port group sets, the target time-frequency resource is the second time-frequency resource.

Embodiment 12

Figure 12:
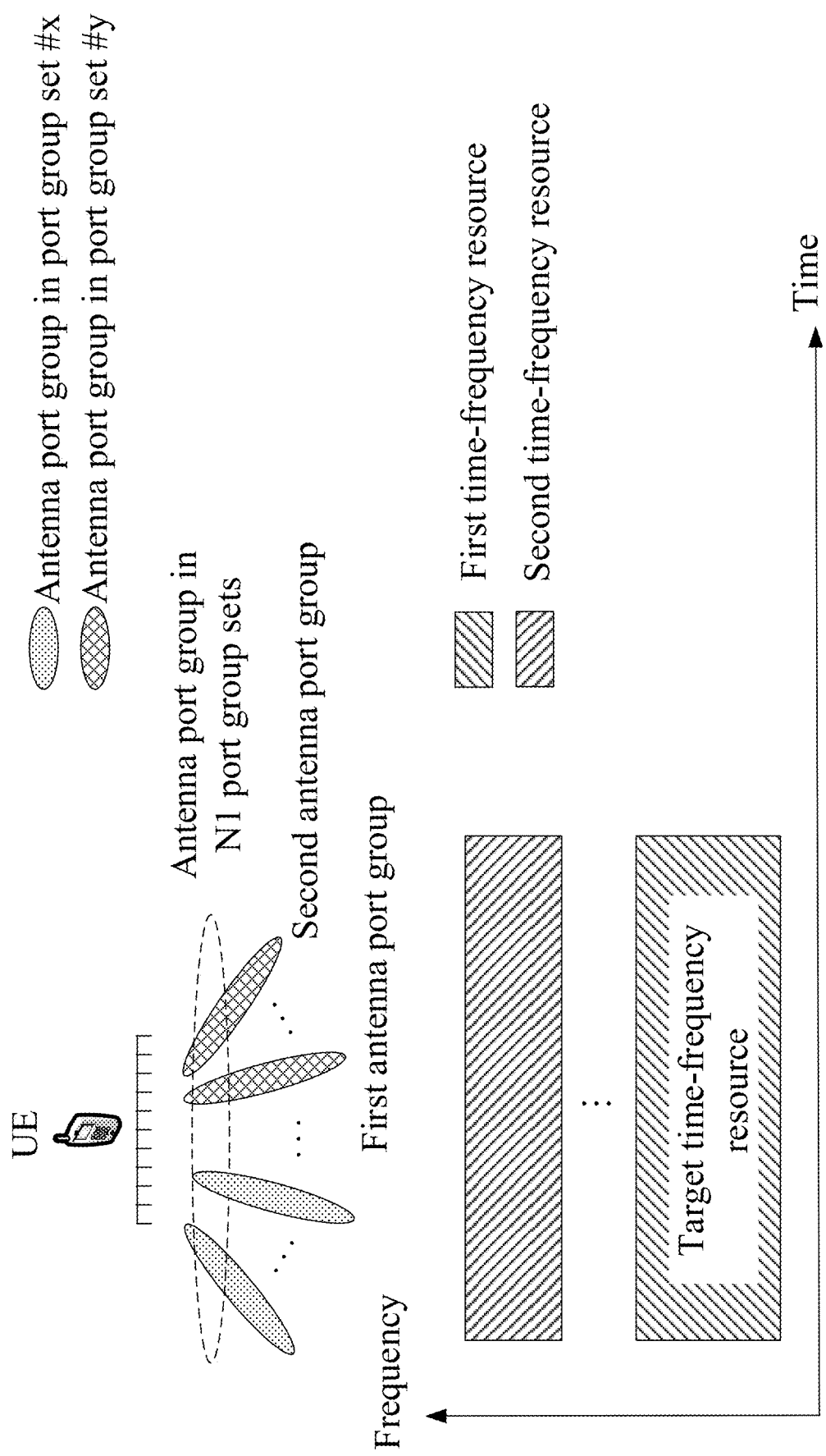
FIG. 12 illustrates a schematic diagram of a first antenna port group and a second antenna port group being used to determine a target time-frequency resource from a first time-frequency resource and a second time-frequency resource according to one embodiment of the present disclosure.

Embodiment 12 illustrates a schematic diagram of a first antenna port group and a second antenna port group being used to determine a target time-frequency resource from a first time-frequency resource and a second time-frequency resource, as shown in FIG. 12.

In Embodiment 12, the first downlink information in the present disclosure indicates N1 port group sets, the N1 being a positive integer greater than 1, and a port group set comprises a positive integer number of antenna port group(s). If the first antenna port group and the second antenna port group belong to a same port group set among the N1 port group sets, the target time-frequency resource is the first time-frequency resource, otherwise the target time-frequency resource is the second time-frequency resource. In FIG. 12, an ellipse represents one antenna port group comprised in the N1 port group sets; an ellipse filled with small dots represents antenna port groups comprised in a port group set #x of the N1 port group sets, and an ellipse filled with cross lines represents an antenna port group comprised in a port group set #y of the N1 port group sets, wherein the x and the y are respectively non-negative integers less than the N1-1, the x being not equal to the y; a box filled with right slashes represents the first time-frequency resource; and a box filled with left slashes represents the second time-frequency resource.

In Embodiment 12, the first antenna port group and the second antenna port group belong to a port group set #y of the N1 port group sets, and the target time-frequency resource is the first time-frequency resource among the first time-frequency resource and the second time-frequency resource.

Embodiment 13

Figure 13:
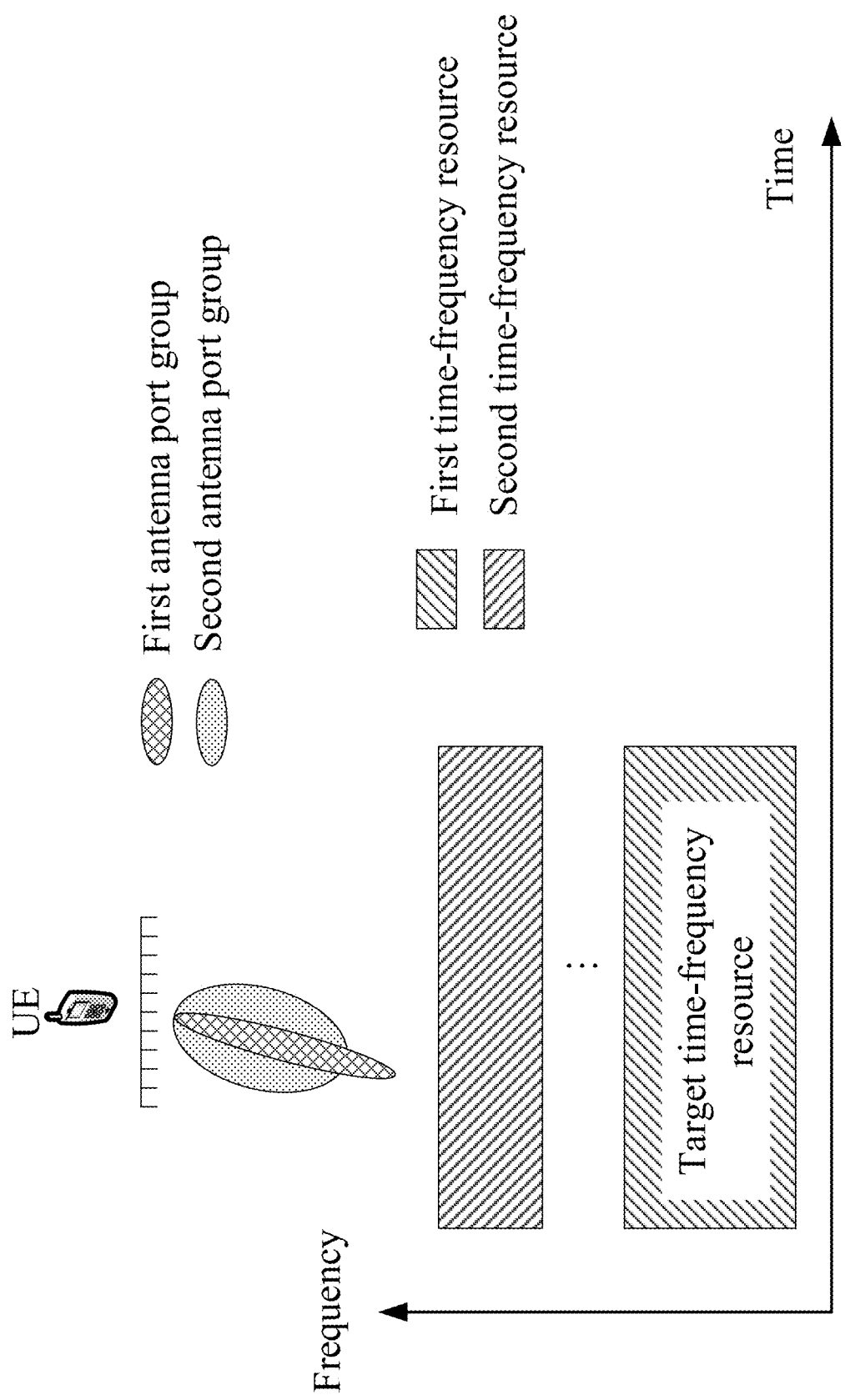
FIG. 13 illustrates a schematic diagram of a first antenna port group and a second antenna port group being used to determine a target time-frequency resource from a first time-frequency resource and a second time-frequency resource according to one embodiment of the present disclosure.

Embodiment 13 illustrates a schematic diagram of a first antenna port group and a second antenna port group being used to determine a target time-frequency resource from a first time-frequency resource and a second time-frequency resource, as shown in FIG. 13.

In Embodiment 13, at least one antenna port in the first antenna port group and at least one antenna port in the second antenna port group are QCL, and the target time-frequency resource is the first time-frequency resource. In FIG. 13, an ellipse filled with cross lines represents the first antenna port group, and an ellipse filled with small dots represents the second antenna port group; a box filled with right slashes represents the first time-frequency resource; and a box filled with left slashes represents the second time-frequency resource.

In one embodiment, if at least one antenna port in the first antenna port group and at least one antenna port in the second antenna port group are QCL, the target time-frequency resource is the first time-frequency resource.

Embodiment 14

Figure 14:
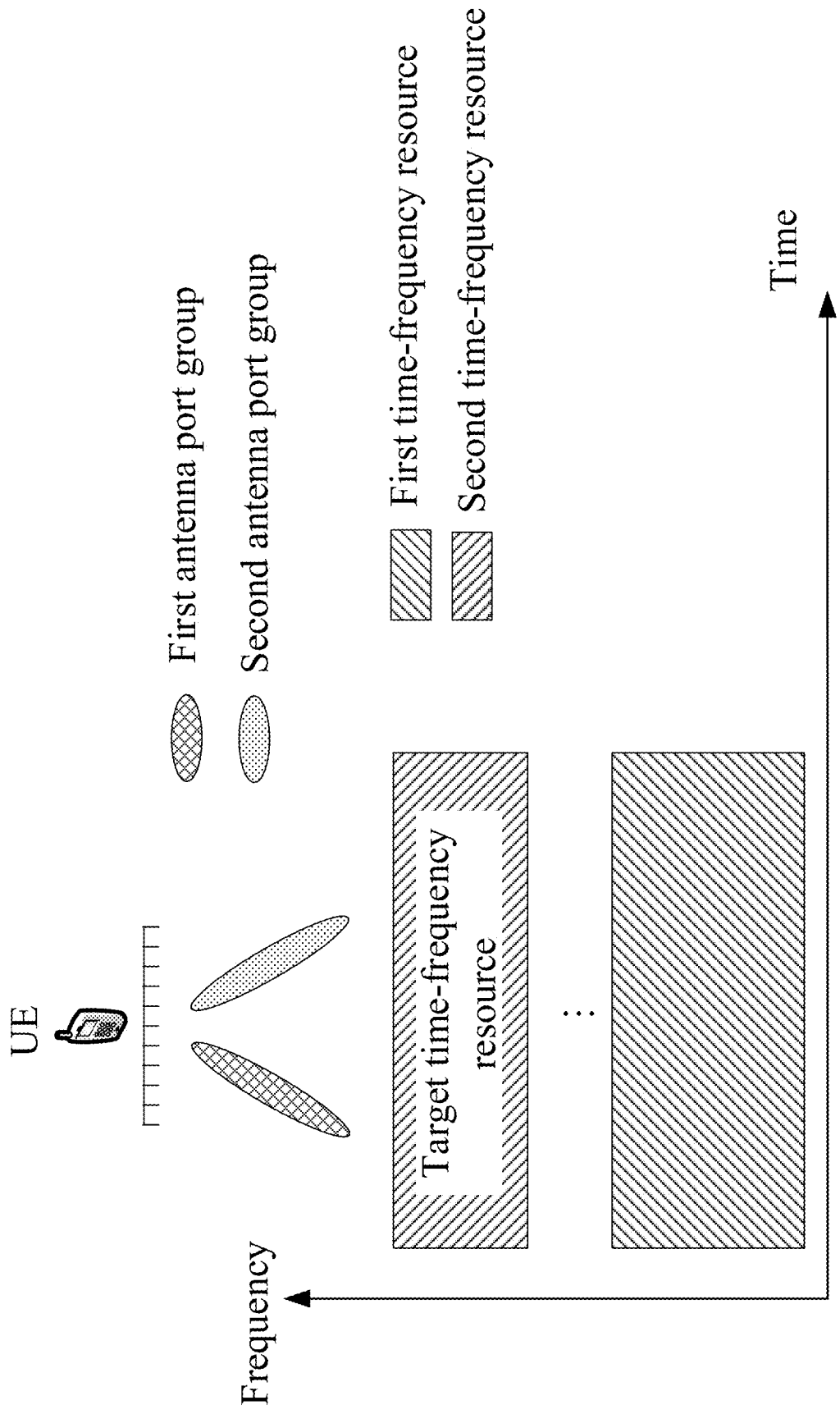
FIG. 14 illustrates a schematic diagram of a first antenna port group and a second antenna port group being used to determine a target time-frequency resource from a first time-frequency resource and a second time-frequency resource according to one embodiment of the present disclosure.

Embodiment 14 illustrates a schematic diagram of a first antenna port group and a second antenna port group being used to determine a target time-frequency resource from a first time-frequency resource and a second time-frequency resource, as shown in FIG. 14.

In Embodiment 14, any antenna port of the first antenna port group and any antenna port of the second antenna port group are not QCL, and the target time-frequency resource is the second time-frequency resource. In FIG. 14, an ellipse filled with cross lines represents the first antenna port group, and an ellipse filled with small dots represents the second antenna port group; a box filled with right slashes represents the first time-frequency resource; and a box filled with left slashes represents the second time-frequency resource.

In one embodiment, if any antenna port of the first antenna port group and any antenna port of the second antenna port group are not QCL, the target time-frequency resource is the second time-frequency resource.

Embodiment 15

Figure 15:
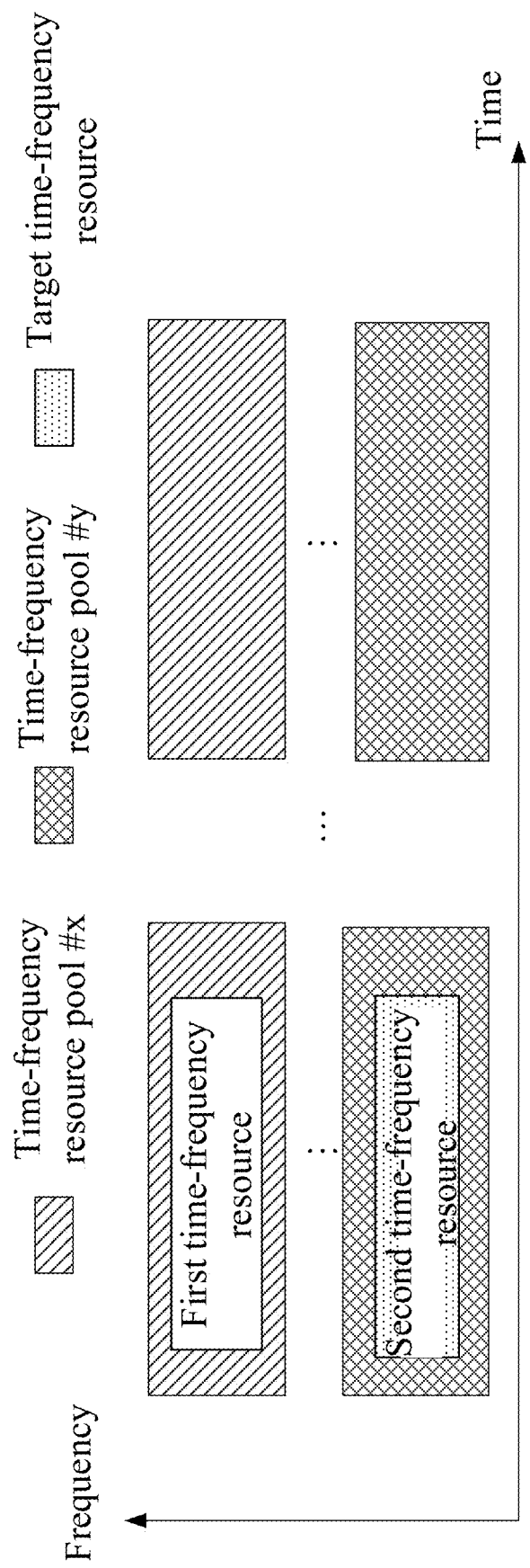
FIG. 15 illustrates a schematic diagram of a first time-frequency resource and a second time-frequency resource being used to determine a target time-frequency resource from the first time-frequency resource and the second time-frequency resource according to one embodiment of the present disclosure.

Embodiment 15 illustrates a schematic diagram of a first time-frequency resource and a second time-frequency resource being used to determine a target time-frequency resource from the first time-frequency resource and the second time-frequency resource, as shown in FIG. 15.

In Embodiment 15, the second downlink information in the present disclosure indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource. In FIG. 15, a box filled with left slashes represents a time-frequency resource pool #x in the N2 time-frequency resource pools, and a box filled with cross lines represents a time-frequency resource pool #y in the N2 time-frequency resource pools, herein the x and the y are respectively non-negative integers less than the N2-1, the x being not equal to the y; a box filled with small dots represents the target time-frequency resource.

In Embodiment 15, the first time-frequency resource and the second time-frequency resource respectively belong to a time-frequency resource pool #x and a time-frequency resource pool #y in the N2 time-frequency resource pools, and the target time-frequency resource is the second time-frequency resource in the first time-frequency resource and the second time-frequency resource.

In one embodiment, the first time-frequency resource and the second time-frequency resource indicate the target time-frequency resource from the first time-frequency resource and the second time-frequency resource.

In one embodiment, the first time-frequency resource and the second time-frequency resource implicitly indicate the target time-frequency resource from the first time-frequency resource and the second time-frequency resource.

In one embodiment, the N2 is equal to 2.

In one embodiment, the N2 is greater than 2.

In one embodiment, if the first time-frequency resource and the second time-frequency resource do not belong to a same time-frequency resource pool among the N2 time-frequency resource pools, the target time-frequency resource is the second time-frequency resource.

In one embodiment, a time-frequency resource pool is composed of a positive integer number of RE(s).

In one embodiment, a time-frequency resource pool comprises a positive integer number of multi-carrier symbol(s) in time domain.

In one embodiment, a time-frequency resource pool comprises a positive integer number of consecutive multi-carrier symbols in time domain.

In one embodiment, a time-frequency resource pool comprises a positive integer number of non-consecutive multi-carrier symbols in time domain.

In one embodiment, a time-frequency resource pool comprises a positive integer number of sub-carrier(s) in frequency domain.

In one embodiment, a time-frequency resource pool comprises a positive integer number of PRB(s) in frequency domain.

In one embodiment, a time-frequency resource pool comprises a positive integer number of consecutive PRBs in frequency domain.

In one embodiment, a time-frequency resource pool comprises a positive integer number of non-consecutive PRBs in frequency domain.

In one embodiment, a time-frequency resource pool comprises a positive integer number of RB(s) in frequency domain.

In one embodiment, a time-frequency resource pool comprises a positive integer number of consecutive RBs in frequency domain.

In one embodiment, a time-frequency resource pool comprises a positive integer number of non-consecutive RBs in frequency domain.

In one embodiment, at least one of the N2 time-frequency resource pools occurs multiple times in time domain.

In one subembodiment of the above embodiment, a time interval between any two adjacent occurrences of at least one of the N2 time-frequency resource pools in time domain is equal.

In one embodiment, at least one of the N2 time-frequency resource pools appears only once in time domain.

Embodiment 16

Figure 16:
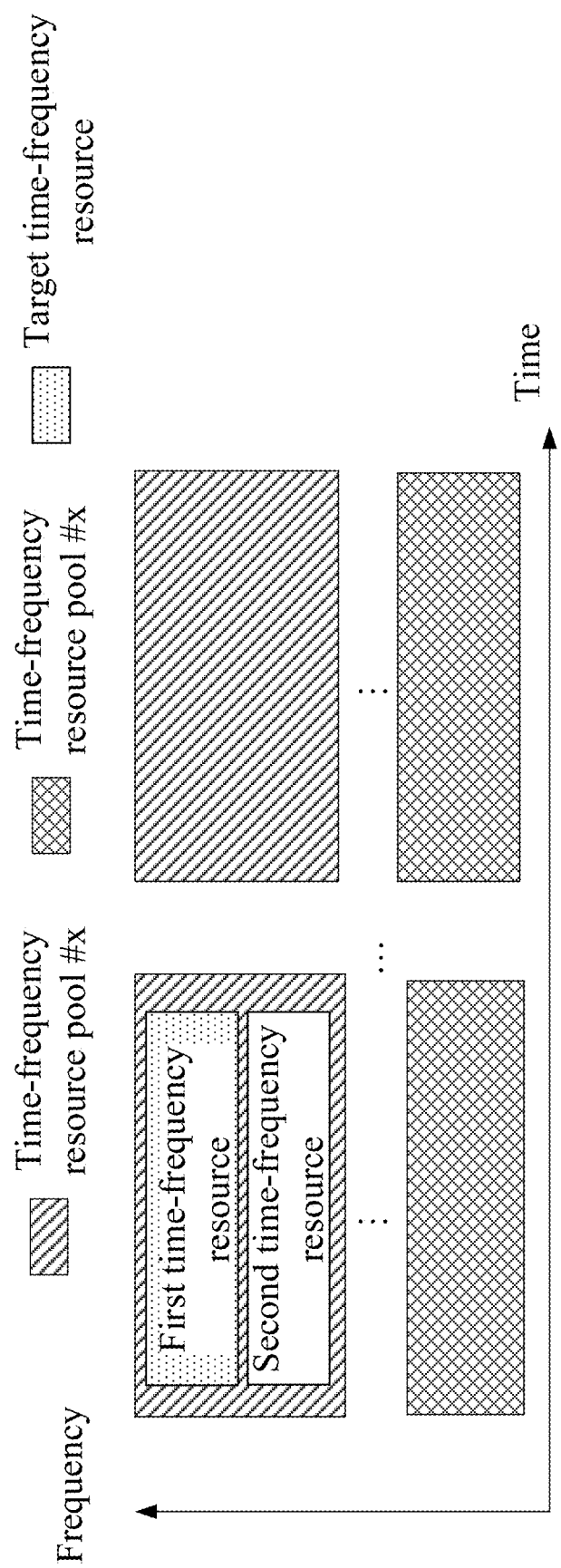
FIG. 16 illustrates a schematic diagram of a first time-frequency resource and a second time-frequency resource being used to determine a target time-frequency resource from the first time-frequency resource and the second time-frequency resource according to one embodiment of the present disclosure.

Embodiment 16 illustrates a schematic diagram of a first time-frequency resource and a second time-frequency resource being used to determine a target time-frequency resource from the first time-frequency resource and the second time-frequency resource, as shown in FIG. 16.

In Embodiment 16, the second downlink information in the present disclosure indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource. In FIG. 16, a box filled with left slashes represents a time-frequency resource pool #x in the N2 time-frequency resource pools, and a box filled with cross lines represents a time-frequency resource pool #y in the N2 time-frequency resource pools, wherein the x and the y are respectively non-negative integers less than the N2-1, the x being not equal to the y; a box filled with small dots represents the target time-frequency resource.

In Embodiment 16, the first time-frequency resource and the second time-frequency resource belong to a time-frequency resource pool #x in the N2 time-frequency resource pools, and the target time-frequency resource is the first time-frequency resource in the first time-frequency resource and the second time-frequency resource.

Embodiment 17

Figure 17:
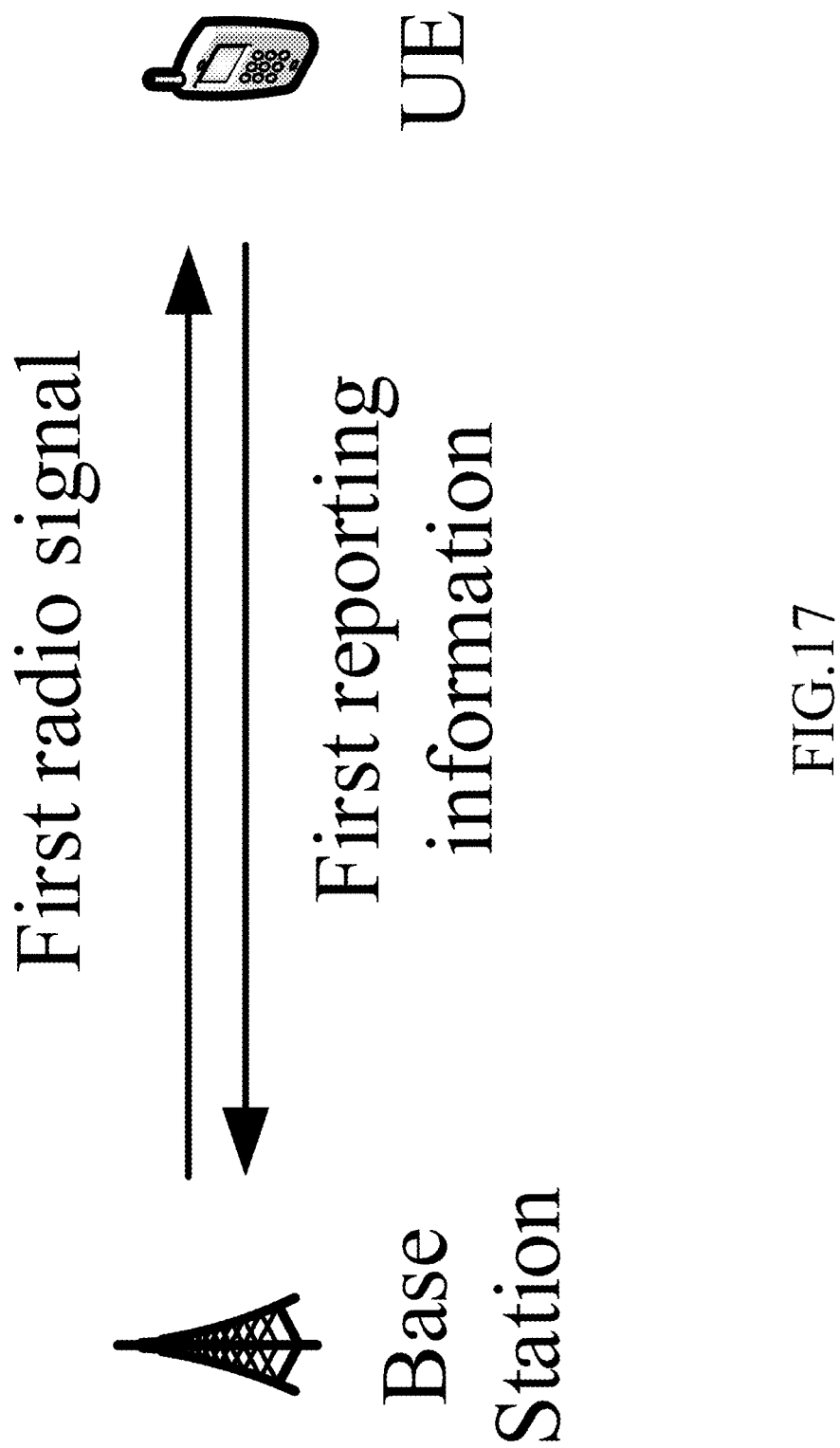
FIG. 17 illustrates a schematic diagram of the relation among a first radio signal and first reporting information according to one embodiment of the present disclosure.

Embodiment 17 illustrates a schematic diagram of the relation among a first radio signal and first reporting information, as shown in FIG. 17.

In Embodiment 17, the first reporting information is used to indicate whether the first radio signal is correctly received.

In one embodiment, the first radio signal comprises downlink data.

In one embodiment, the first reporting information comprises HARQ-ACK.

In one embodiment, a transmission antenna port group of the first radio signal is used to determine the target time-frequency resource in the present disclosure from the first time-frequency resource and the second time-frequency resource in the present disclosure.

In one embodiment, if a transmission antenna port group of the first radio signal belongs to a target port group set, the target time-frequency resource is the first time-frequency resource; if a transmission antenna port group of the first radio signal does not belong to the target port group set, the target time-frequency resource is the second time-frequency resource. The target port group set comprises a positive integer number of antenna port group(s).

In one subembodiment of the above embodiment, the target port group set is configured by a higher-layer signaling.

In one subembodiment of the above embodiment, the target port group set is configured by an RRC signaling.

In one subembodiment of the above embodiment, the target port group set is configured by a MAC CE signaling.

In one subembodiment of the above embodiment, the target port group set only comprises one antenna port group.

In one subembodiment of the above embodiment, the target port group set comprises multiple antenna port groups.

In one embodiment, at least one transmission antenna port of the first radio signal and at least one antenna port of a first reference antenna port group are QCL; if the first reference antenna port group and a second reference antenna port group belong to a same port group set among N3 port group sets, the target time-frequency resource is the first time-frequency resource; otherwise the target time-frequency resource is the second time-frequency resource. Spatial Rx parameters for a radio signal transmitted on the second reference antenna port group are used to determine Spatial Tx parameters corresponding to the first antenna port group. A port group set comprises a positive integer number of antenna port group(s). The N3 is a positive integer greater than 1.

In one subembodiment of the above embodiment, the N3 is equal to 2.

In one subembodiment of the above embodiment, the N3 is greater than 2.

In one subembodiment of the above embodiment, the N3 port group sets are configured by a higher-layer signaling.

In one subembodiment of the above embodiment, the N3 port group sets are configured by an RRC signaling.

In one subembodiment of the above embodiment, the N3 port group sets are configured by a MAC CE signaling.

In one embodiment, if at least one transmission antenna port of the first radio signal and at least one antenna port of a second reference antenna port group are QCL, the target time-frequency resource is the first time-frequency resource; if any transmission antenna port of the first radio signal and any antenna port of the second reference antenna port group are not QCL, the target time-frequency resource is the second time-frequency resource. Spatial Rx parameters for a radio signal transmitted on the second reference antenna port group are used to determine Spatial Tx parameters corresponding to the first antenna port group.

Embodiment 18

Figure 18:
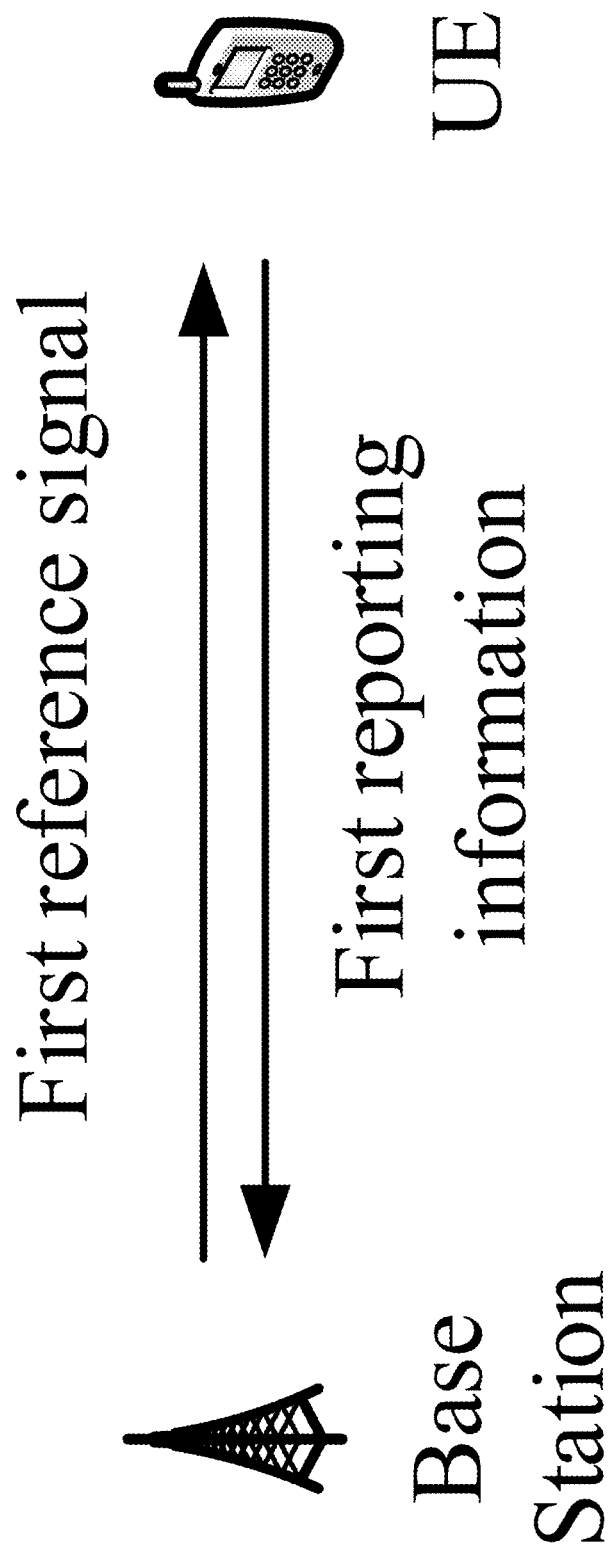
FIG. 18 illustrates a schematic diagram of the relation among a first reference signal and first reporting information according to one embodiment of the present disclosure.

Embodiment 18 illustrates a schematic diagram of the relation among a first reference signal and first reporting information, as shown in FIG. 18.

In Embodiment 18, a measurement on the first reference signal is used to determine the first reporting information.

In one embodiment, the first reference signal comprises a Channel State Information-Reference Signal (CSI-RS).

In one embodiment, the first reference signal comprises a Synchronization Signal/Physical Broadcast CHannel (SS/PBCH block)

In one embodiment, the first reference signal is periodic.

In one embodiment, the first reference signal is semi-persistent.

In one embodiment, the first reference signal is aperiodic.

In one embodiment, a measurement on the first reference signal is used to determine UCI carried by the first reporting information.

In one embodiment, a measurement on the first reference signal is used to determine a first measured value, and the first measured value is used to determine the first reporting information.

In one subembodiment of the above embodiment, the first measured value comprises one or more of RI, CRI, RSRP, RSPQ, PMI and CQI.

In one subembodiment of the above embodiment, the first reporting information comprises a quantized value of the first measured value.

In one embodiment, the first reporting information comprises a Channel-state information reference signals Resource Indicator (CRI).

In one embodiment, the first reporting information comprises Channel-State Information (CSI).

In one embodiment, a transmission antenna port group of the first reference signal is used to determine the target time-frequency resource from the first time-frequency resource and the second time-frequency resource.

In one embodiment, if a transmission antenna port group of the first reference signal belongs to a target port group set, the target time-frequency resource is the first time-frequency resource; if a transmission antenna port group of the first reference signal does not belong to the target port group set, the target time-frequency resource is the second time-frequency resource. The target port group set comprises a positive integer number of antenna port group(s).

In one subembodiment of the above embodiment, the target port group set is configured by a higher-layer signaling.

In one subembodiment of the above embodiment, the target port group set is configured by an RRC signaling.

In one subembodiment of the above embodiment, the target port group set is configured by a MAC CE signaling.

In one subembodiment of the above embodiment, the target port group set only comprises one antenna port group.

In one subembodiment of the above embodiment, the target port group set comprises multiple antenna port groups.

In one embodiment, at least one transmission antenna port of the first reference signal and at least one antenna port of a fourth reference antenna port group are QCL; if the fourth reference antenna port group and a second reference antenna port group belong to a same port group set among N3 port group sets, the target time-frequency resource is the first time-frequency resource; otherwise the target time-frequency resource is the second time-frequency resource. Spatial Rx parameters for a radio signal transmitted on the second reference antenna port group are used to determine Spatial Tx parameters corresponding to the first antenna port group. A port group set comprises a positive integer number of antenna port group(s). The N3 is a positive integer greater than 1.

In one subembodiment of the above embodiment, the N3 is equal to 2.

In one subembodiment of the above embodiment, the N3 is greater than 2.

In one subembodiment of the above embodiment, the N3 port group sets are configured by a higher-layer signaling.

In one subembodiment of the above embodiment, the N3 port group sets are configured by an RRC signaling.

In one subembodiment of the above embodiment, the N3 port group sets are configured by a MAC CE signaling.

In one embodiment, if at least one transmission antenna port of the first reference signal and at least one antenna port of a second reference antenna port group are QCL, the target time-frequency resource is the first time-frequency resource; if any transmission antenna port of the first reference signal and any antenna port of the second reference antenna port group are not QCL, the target time-frequency resource is the second time-frequency resource. Spatial Rx parameters for a radio signal transmitted on the second reference antenna port group are used to determine Spatial Tx parameters corresponding to the first antenna port group.

Embodiment 19

Figure 19:
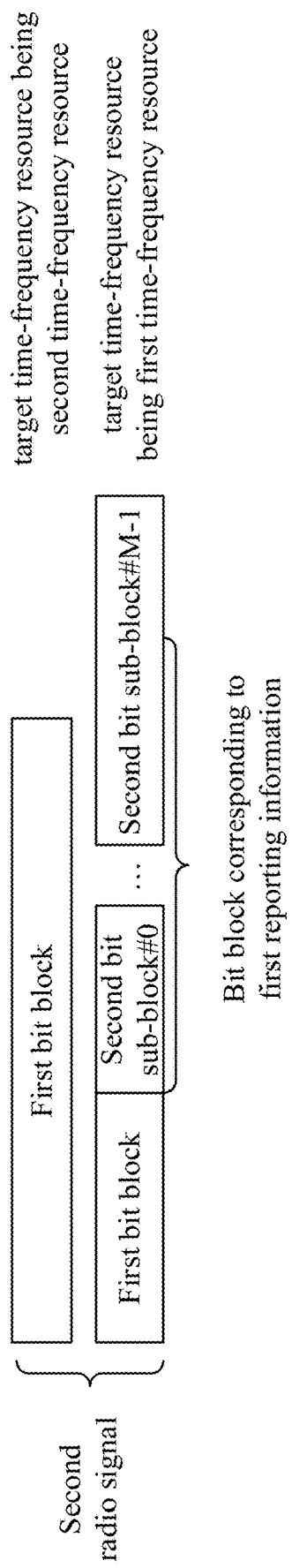
FIG. 19 illustrates a schematic diagram of a content carried by a second radio signal according to one embodiment of the present disclosure.

Embodiment 19 illustrates a schematic diagram of contents carried by a second radio signal, as shown in FIG. 19.

In Embodiment 19, the second radio signal is transmitted in the first time-frequency resource of the present disclosure. The second radio signal carries a first bit block, which comprises a positive integer number of bit(s). If the target time-frequency resource in the present disclosure is the first time-frequency resource, the second radio signal carries a bit block corresponding to the first reporting information in the present disclosure; if the target time-frequency resource is the second time-frequency resource in the present disclosure, the second radio signal does not carry a bit block corresponding to the first reporting information. The bit block corresponding to the first reporting information comprises M second bit sub-block(s), any of which comprises a positive integer number of bit(s), the M being a positive integer. In FIG. 19, an index(indexes) of the M second bit sub block(s) is(are) respectively {#0, #M−1}.

In one embodiment, the first bit block includes uplink data.

In one embodiment, a bit block corresponding to the first reporting information includes UCI.

In one embodiment, the target time-frequency resource is the first time-frequency resource, and the second radio signal carries the first reporting information.

In one embodiment, the target time-frequency resource is the first time-frequency resource, and the second radio signal carries a bit block corresponding to the first reporting information.

In one embodiment, the target time-frequency resource is the second time-frequency resource, and the second radio signal does not carry the first reporting information.

In one embodiment, the target time-frequency resource is the first time-frequency resource, and the second radio signal does not carry a bit block corresponding to the first reporting information.

In one embodiment, the given bit block carried by the second radio signal refers to that the second radio signal is an output after the given bit block is sequentially subjected to Channel Coding, a Modulation Mapper, a Layer Mapper, Precoding, a Resource Element Mapper, and wideband symbol generation. The given bit block is a bit block corresponding to the first bit block or the first reporting information.

In one embodiment, the given bit block carried by the second radio signal refers to that the second radio signal is an output after the given bit block is sequentially subjected to Channel Coding, a Modulation Mapper, a Layer Mapper, a transform precoder (which is configured to generate a complex value signal), precoding, a resource element mapper, and wideband symbol generation. The given bit block is a bit block corresponding to the first bit block or the first reporting information.

In one embodiment, the given bit block carried by the second radio signal refers to that the given bit block is used to generate the second radio signal. The given bit block is a bit block corresponding to the first bit block or the first reporting information.

In one embodiment, the M is equal to 1.

In one embodiment, the M is greater than 1.

In one embodiment, the first bit block comprises a first information bit block and a first check bit block, the first check bit block is generated by a Cyclic Redundancy Check (CRC) bit block of the first information bit block.

In one subembodiment of the above embodiment, the first check bit block is a CRC bit block of the first information bit block.

In one subembodiment of the above embodiment, the first check bit block is a bit block after a CRC bit block of the first information bit block is scrambled.

In one embodiment, a given second bit sub-block comprises a given information bit block and a given check bit block, the given check bit block is generated by a CRC bit block of the given information bit block; the given second bit sub-block is one of M1 second bit sub-block(s); the M1 second bit sub-block(s) is(are) subset(s) of the M second bit sub-block(s).

In one subembodiment of the above embodiment, the given check bit block is a CRC bit block of the given information bit block.

In one subembodiment of the above embodiment, the given check bit block is a bit block after a CRC bit block of the given information bit block is scrambled.

In one subembodiment of the above embodiment, the M1 is less than the M.

In one subembodiment of the above embodiment, the M1 is equal to the M.

Embodiment 20

Figure 20:
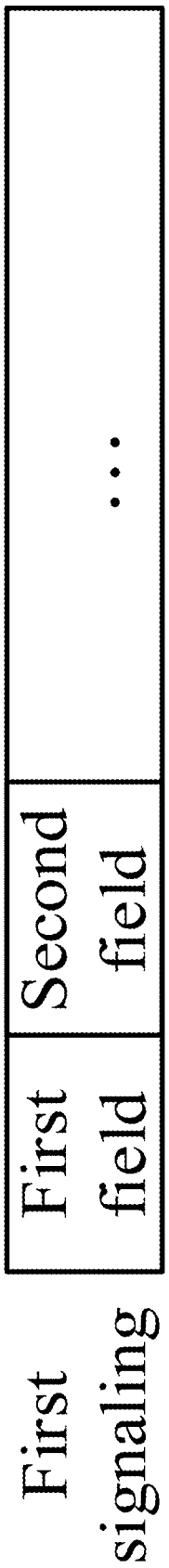
FIG. 20 illustrates a schematic diagram of a first signaling according to one embodiment of the present disclosure.

Embodiment 20 illustrates a schematic diagram of a first signaling, as shown in FIG. 20.

In Embodiment 20, the first signaling comprises a first field and a second field. The first field in the first signaling indicates the first time-frequency resource in the present disclosure, and the second field in the first signaling indicates the first antenna port group in the present disclosure.

In one embodiment, the first signaling comprises a first field, and the first field of the first signaling indicates the first time-frequency resource.

In one embodiment, the first field of the first signaling explicitly indicates the first time-frequency resource.

In one embodiment, the first field of the first signaling implicitly indicates the first time-frequency resource.

In one embodiment, the first field of the first signaling comprises a Frequency domain resource assignment field and a Time domain resource assignment field; the specific meaning of the Frequency domain resource assignment field and the Time domain resource assignment field can be found in 3GPP TS38.212, chapter 7.3.1 and 3GPP TS38.214, chapter 5.1.2.

In one embodiment, the first field in the first signaling comprises at least one of a Resource block assignment and hopping resource allocation field, a Resource allocation type field, a Resource block assignment field, a Timing offset field, a PUSCH starting position field, a PUSCH ending symbol field or a Number of scheduled subframe field; the specific meaning of the Resource block assignment and hopping resource allocation field, the Resource allocation type field, the Resource block assignment field and the Timing offset field can be found in 3GPP TS36.212, chapter 5.3.3 and 3GPP TS36.213, chapter 8; and the specific meaning of the PUSCH starting position field, the PUSCH ending symbol field and the Number of scheduled subframe field can be found in 3GPP TS36.212, chapter 5.3.3.

In one embodiment, the first field of the first signaling comprises a positive integer number of bit(s).

In one embodiment, the first signaling comprises a second field, wherein the second field indicates the first antenna port group.

In one embodiment, the second field of the first signaling explicitly indicates the first antenna port group.

In one embodiment, the second field of the first signaling implicitly indicates the first antenna port group.

In one embodiment, the second field of the first signaling comprises at least one of an SRS resource indicator field or a Precoding information and number of layers field; the specific meaning of the SRS resource indicator field can be found in 3GPP TS38.212, chapter 7.3.1; and the specific meaning of the Precoding information and number of layers field can be found in 3GPP TS38.212, chapter 7.3.1 and 3GPP TS36.212, chapter 5.3.3.

In one embodiment, the second field of the first signaling comprises a positive integer number of bit(s).

In one embodiment, the first antenna port group is one of P1 candidate antenna port groups, and the first signaling is used to indicate the first antenna port group from the P1 candidate antenna port groups, the P1 being a positive integer greater than 1.

In one subembodiment of the above embodiment, the second field in the first signaling indicates the first antenna port group from the P1 candidate antenna port groups.

Embodiment 21

Figure 21:
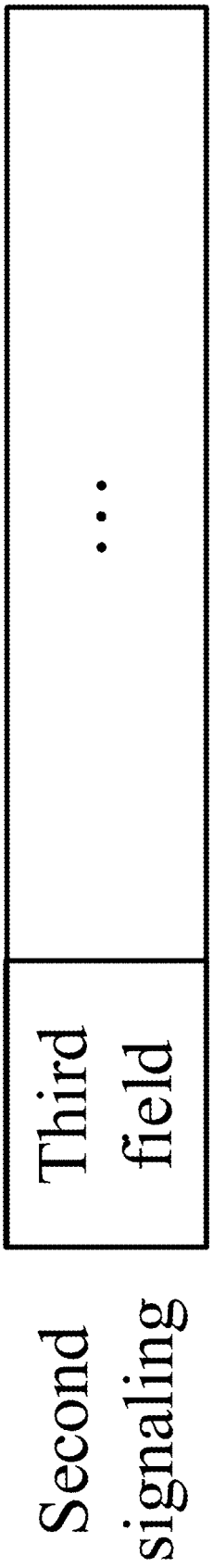
FIG. 21 illustrates a schematic diagram of a second signaling according to one embodiment of the present disclosure.

Embodiment 21 illustrates a schematic diagram of a second signaling, as shown in FIG. 21.

In Embodiment 21, the second signaling comprises a third field, wherein the third field indicates the second time-frequency resource in the present disclosure.

In one embodiment, the second signaling comprises a third field, wherein the third field indicates the second time-frequency resource.

In one embodiment, the third field of the second signaling explicitly indicates the second time-frequency resource.

In one embodiment, the third field of the second signaling implicitly indicates the second time-frequency resource.

In one embodiment, the third field of the second signaling comprises at least one of a PUCCH resource indicator field or a PDSCH-to-HARQ feedback timing indicator field, and the specific meaning of the PUCCH resource indicator field and the PDSCH-to-HARQ feedback timing indicator field can be found in 3GPP TS38.212, chapter 7.3.1 and 3GPP TS38.213, chapter 9.2.

In one embodiment, the third field of the second signaling comprises a HARQ-ACK resource offset field, and the specific meaning of the HARQ-ACK resource offset field can be found in 3GPP TS36.212, chapter 5.3.3.

In one embodiment, the third field of the second signaling comprises a positive integer number of bit(s).

In one embodiment, the second time-frequency resource is one of P2 candidate time-frequency resources, and the second signaling is used to indicate the second time-frequency resource from the P2 candidate time-frequency resources, the P2 being a positive integer greater than 1.

In one subembodiment of the above embodiment, the third field of the second signaling includes indicating the second time-frequency resource from the P2 candidate time-frequency resources.

In one embodiment, the third field in the second signaling indicates the second antenna port group in the present disclosure.

In one embodiment, the third field of the second signaling explicitly indicates the second antenna port group.

In one embodiment, the third field of the second signaling implicitly indicates the second antenna port group.

In one embodiment, the second antenna port group is correlated with the second time-frequency resource.

In one subembodiment of the above embodiment, a transmission antenna port of any radio signal transmitted within the second time-frequency resource by the UE in the present disclosure and at least one antenna port of the second antenna port group are QCL.

In one subembodiment of the above embodiment, the UE in the present disclosure uses an antenna port in the second antenna port group to transmit a radio signal within the second time-frequency resource.

Embodiment 22

Figure 22:
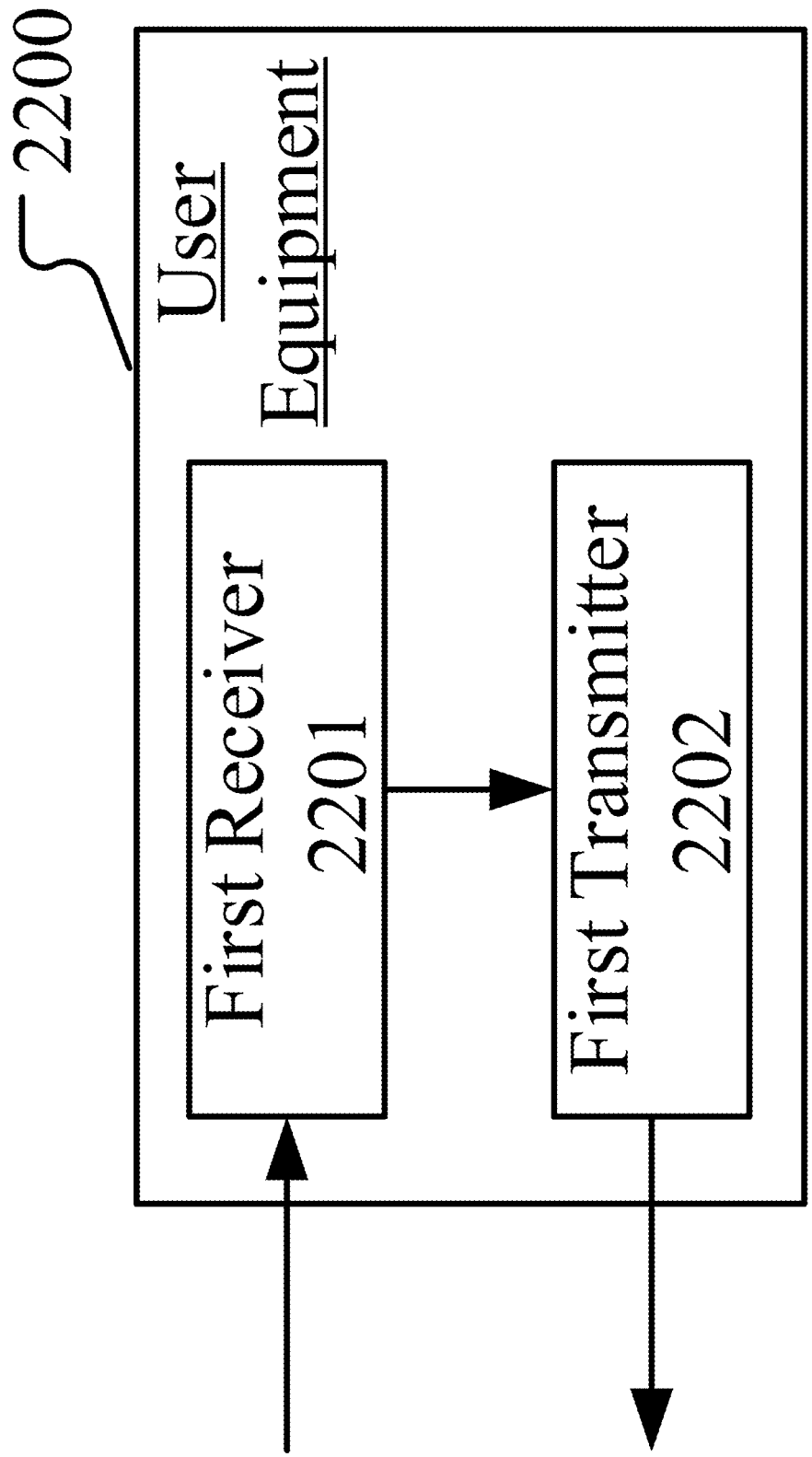
FIG. 22 illustrates a structure block diagram of a processing device in a UE according to one embodiment of the present disclosure.

Embodiment 22 illustrates a structure block diagram of a processing device in a UE, as shown in FIG. 22. In FIG. 22, the processing device 2200 in the UE is mainly composed of a first receiver 2201 and a first transmitter 2202.

In Embodiment 22, a first receiver 2201 receives a first signaling and a second signaling; and a first transmitter 2202 transmits first reporting information in a target time-frequency resource.

In Embodiment 22, the target time-frequency resource is one of a first time-frequency resource and a second time-frequency resource; the first signaling and the second signaling are respectively used by the first transmitter 2202 to determine a first antenna port group and a second antenna port group. The first antenna port group and the second antenna port group are respectively applicable to the first time-frequency resource and the second time-frequency resource. An antenna port group comprises a positive integer number of antenna port(s). At least one of the following is used by the first transmitter 2202 to determine the target time-frequency resource from the first time-frequency resource and the second time-frequency resource: the first antenna port group, the second antenna port group, the first time-frequency resource, the second time-frequency resource and first information; wherein the first information explicitly indicates the target time-frequency resource from the first time-frequency resource and the second time-frequency resource.

In one embodiment, the first receiver 2201 also receives a first radio signal; wherein the first reporting information is used to indicate whether the first radio signal is correctly received.

In one embodiment, the first receiver 2201 also receives a first reference signal; wherein a measurement on the first reference signal is used by the first transmitter 2202 to determine the first reporting information.

In one embodiment, the first transmitter 2202 also transmits a second radio signal in the first time-frequency resource; wherein the first signaling comprises scheduling information of the second radio signal.

In one embodiment, the first receiver 2201 also receives first downlink information; wherein the first downlink information indicates N1 port group sets, the N1 being a positive integer greater than 1, and a port group set comprises a positive integer number of antenna port group(s); if the first antenna port group and the second antenna port group belong to a same port group set among the N1 port group sets, the target time-frequency resource is the first time-frequency resource, otherwise the target time-frequency resource is the second time-frequency resource.

In one embodiment, the first receiver 2201 also receives second downlink information; wherein the second downlink information indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource.

In one embodiment, the first receiver 2201 also receives the first information; wherein the first information explicitly indicates the target time-frequency resource from the first time-frequency resource and the second time-frequency resource.

In one embodiment, the target time-frequency resource is independent of a signaling format of the first signaling and a signaling format of the second signaling.

In one embodiment, the first receiver 2201 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 2202 comprises at least one of the antenna 452, the transmitter 454, the transmitting processor 468, the multi-antenna transmitting processor 457, the controller/processor 459, the memory 460, or the data source 467 in Embodiment 4.

Embodiment 23

Figure 23:
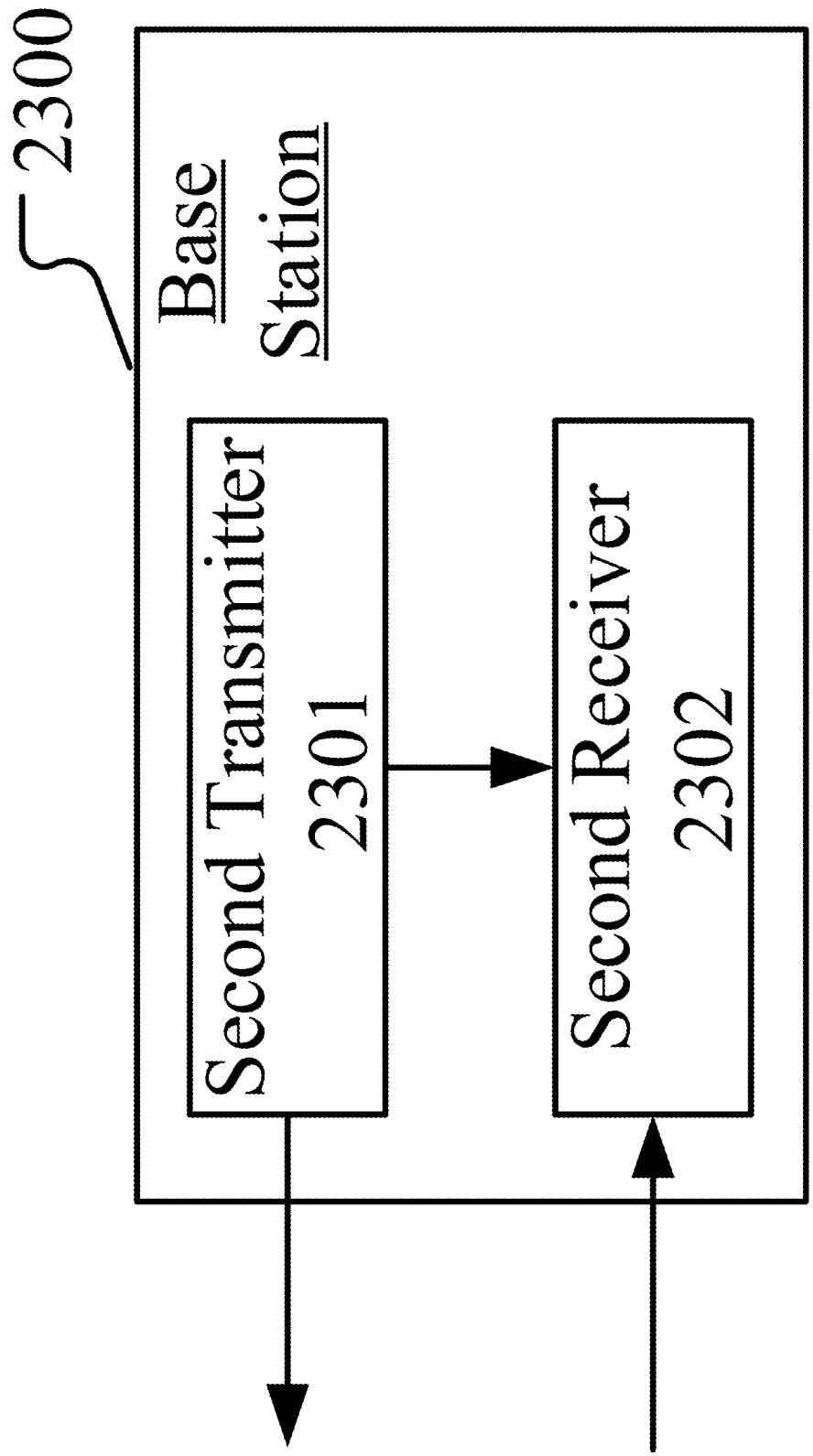
FIG. 23 illustrates a structure block diagram of a processing device in a base station according to one embodiment of the present disclosure.

Embodiment 23 illustrates a block diagram of a processing device for a base station, as shown in FIG. 23. In FIG. 23, a processing device 2300 in the base station is mainly composed of a second transmitter 2301 and a second receiver 2302.

In Embodiment 23, a second transmitter 2301 transmits a first signaling and a second signaling; a second receiver 2302 receives first reporting information in a target time-frequency resource.

In Embodiment 23, the target time-frequency resource is one of a first time-frequency resource and a second time-frequency resource; the first signaling and the second signaling are respectively used to determine a first antenna port group and a second antenna port group. The first antenna port group and the second antenna port group are respectively applicable to the first time-frequency resource and the second time-frequency resource. An antenna port group comprises a positive integer number of antenna port(s). At least one of the following is used to determine the target time-frequency resource from the first time-frequency resource and the second time-frequency resource: the first antenna port group, the second antenna port group, the first time-frequency resource, the second time-frequency resource and first information; herein the first information explicitly indicates the target time-frequency resource from the first time-frequency resource and the second time-frequency resource.

In one embodiment, the second transmitter 2301 also transmits a first radio signal; wherein the first reporting information is used to indicate whether the first radio signal is correctly received.

In one embodiment, the second transmitter 2301 also transmits a first reference signal; wherein a measurement on the first reference signal is used to determine the first reporting information.

In one embodiment, the second receiver 2302 also receives a second radio signal in the first time-frequency resource; wherein the first signaling comprises scheduling information of the second radio signal.

In one embodiment, the second transmitter 2301 also transmits first downlink information; wherein the first downlink information indicates N1 port group sets, the N1 being a positive integer greater than 1, and a port group set comprises a positive integer number of antenna port group(s); if the first antenna port group and the second antenna port group belong to a same port group set among the N1 port group sets, the target time-frequency resource is the first time-frequency resource, otherwise the target time-frequency resource is the second time-frequency resource.

In one embodiment, the second transmitter 2301 also transmits second downlink information; wherein the second downlink information indicates N2 time-frequency resource pools, the N2 being a positive integer greater than 1, and a time-frequency resource pool comprises a positive integer number of Resource Elements; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource.

In one embodiment, the second transmitter 2301 also transmits first information; wherein the first information explicitly indicates the target time-frequency resource from the first time-frequency resource and the second time-frequency resource.

In one embodiment, the target time-frequency resource is independent of a signaling format of the first signaling and a signaling format of the second signaling.

In one embodiment, the second transmitter 2301 comprises at least one of the antenna 420, the transmitter 418, the transmitting processor 416, the multi-antenna transmitting processor 471, the controller/processor 475, or the memory 476 in Embodiment 4.

In one embodiment, the second receiver 2302 comprises at least one of the antenna 420, the receiver 418, the receiving processor 470, the multi-antenna receiving processor 472, the controller/processor 475, or the memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
receiving second downlink information;
receiving a first signaling and a second signaling; and
transmitting first reporting information in a target time-frequency resource, the target time-frequency resource being one of a first time-frequency resource and a second time-frequency resource;
wherein the second downlink information indicates N2 time-frequency resource pools, the N2 being a positive integer greater than 1, and a time-frequency resource pool comprises a positive integer number of Resource Elements; the first signaling and the second signaling are respectively used to determine a first antenna port group and a second antenna port group; the first antenna port group and the second antenna port group are respectively applicable to the first time-frequency resource and the second time-frequency resource; an antenna port group comprises a positive integer number of antenna port(s); the first time-frequency resource and the second time-frequency resource are used for determining the target time-frequency resource from the first time-frequency resource and the second time-frequency resource; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pool, the target time-frequency resource is the second time-frequency resource.

2. The method according to claim 1, comprising:
receiving a first radio signal, wherein the first reporting information is used to indicate whether the first radio signal is correctly received;
or,
receiving a first reference signal, wherein a measurement on the first reference signal is used to determine the first reporting information;
or,
transmitting a second radio signal in the first time-frequency resource, wherein the first signaling comprises scheduling information of the second radio signal.

3. The method according to claim 1, wherein the target time-frequency resource is independent of a signaling format of the first signaling and a signaling format of the second signaling.

4. The method according to claim 1, wherein the first time-frequency resource and the second time-frequency resource occupy same or partially overlapping time resources in time domain.

5. The method according to claim 1, wherein time resources occupied by the first signaling are later than time resources occupied by the second signaling.

6. A method in a base station for wireless communication, comprising:
transmitting second downlink information;
transmitting a first signaling and a second signaling; and
receiving first reporting information in a target time-frequency resource, the target time-frequency resource being one of a first time-frequency resource and a second time-frequency resource;
wherein the second downlink information indicates N2 time-frequency resource pools, the N2 being a positive integer greater than 1, and a time-frequency resource pool comprises a positive integer number of Resource Elements; the first signaling and the second signaling are respectively used to determine a first antenna port group and a second antenna port group; the first antenna port group and the second antenna port group are respectively applicable to the first time-frequency resource and the second time-frequency resource; an antenna port group comprises a positive integer number of antenna port(s); the first time-frequency resource and the second time-frequency resource are used for determining the target time-frequency resource from the first time-frequency resource and the second time-frequency resource; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pools, the target time-frequency resource is the second time-frequency resource.

7. The method according to claim 6, comprising:
transmitting a first radio signal, wherein the first reporting information is used to indicate whether the first radio signal is correctly received;
or,
transmitting a first reference signal, wherein a measurement on the first reference signal is used to determine the first reporting information;
or,
receiving a second radio signal in the first time-frequency resource, wherein the first signaling comprises scheduling information of the second radio signal.

8. The method according to claim 6, wherein the target time-frequency resource is independent of a signaling format of the first signaling and a signaling format of the second signaling.

9. The method according to claim 6, wherein the first time-frequency resource and the second time-frequency resource occupy same or partially overlapping time resources in time domain.

10. The method according to claim 6, wherein time resources occupied by the first signaling are later than time resources occupied by the second signaling.

11. A User Equipment (UE) for wireless communication, comprising:
a first receiver, receiving second downlink information, and receiving a first signaling and a second signaling; and
a first transmitter, transmitting first reporting information in a target time-frequency resource, the target time-frequency resource being one of a first time-frequency resource and a second time-frequency resource;
wherein the second downlink information indicates N2 time-frequency resource pools, the N2 being a positive integer greater than 1, and a time-frequency resource pool comprises a positive integer number of Resource Elements; the first signaling and the second signaling are respectively used to determine a first antenna port group and a second antenna port group; the first antenna port group and the second antenna port group are respectively applicable to the first time-frequency resource and the second time-frequency resource; an antenna port group comprises a positive integer number of antenna port(s); the first time-frequency resource and the second time-frequency resource are used for determining the target time-frequency resource from the first time-frequency resource and the second time-frequency resource; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pools, the target time-frequency resource is the second time-frequency resource.

12. The UE according to claim 11, wherein the first receiver receives a first radio signal, herein the first reporting information is used to indicate whether the first radio signal is correctly received;
or, the first receiver receives a first reference signal, wherein a measurement on the first reference signal is used to determine the first reporting information;
or, the first transmitter transmits a second radio signal in the first time-frequency resource, wherein the first signaling comprises scheduling information of the second radio signal.

13. The UE according to claim 11, wherein the target time-frequency resource is independent of a signaling format of the first signaling and a signaling format of the second signaling.

14. The UE according to claim 11, wherein the first time-frequency resource and the second time-frequency resource occupy same or partially overlapping time resources in time domain.

15. The UE according to claim 11, wherein time resources occupied by the first signaling are later than time resources occupied by the second signaling.

16. A base station for wireless communication, comprising:
a second transmitter, transmitting second downlink information, and transmitting a first signaling and a second signaling; and
a second receiver, receiving first reporting information in a target time-frequency resource, the target time-frequency resource being one of a first time-frequency resource and a second time-frequency resource;
wherein the second downlink information indicates N2 time-frequency resource pools, the N2 being a positive integer greater than 1, and a time-frequency resource pool comprises a positive integer number of Resource Elements; the first signaling and the second signaling are respectively used to determine a first antenna port group and a second antenna port group; the first antenna port group and the second antenna port group are respectively applicable to the first time-frequency resource and the second time-frequency resource; an antenna port group comprises a positive integer number of antenna port(s); the first time-frequency resource and the second time-frequency resource are used for determining the target time-frequency resource from the first time-frequency resource and the second time-frequency resource; when the first time-frequency resource and the second time-frequency resource belong to a same time-frequency resource pool among the N2 time-frequency resource pools, the target time-frequency resource is the first time-frequency resource; when the first time-frequency resource and the second time-frequency resource belong to different time-frequency resource pools among the N2 time-frequency resource pools, the target time-frequency resource is the second time-frequency resource.

17. The base station according to claim 16, wherein the second transmitter transmits a first radio signal, and the first reporting information is used to indicate whether the first radio signal is correctly received;
or, the second transmitter transmits a first reference signal, wherein a measurement on the first reference signal is used to determine the first reporting information;
or, the second receiver receives a second radio signal in the first time-frequency resource, wherein the first signaling comprises scheduling information of the second radio signal.

18. The base station according to claim 16, wherein the target time-frequency resource is independent of a signaling format of the first signaling and a signaling format of the second signaling.

19. The base station according to claim 16, wherein the first time-frequency resource and the second time-frequency resource occupy same or partially overlapping time resources in time domain.

20. The base station according to claim 16, wherein time resources occupied by the first signaling are later than time resources occupied by the second signaling.

* * * * *